US008118120B2

(12) United States Patent
Flowers et al.

(10) Patent No.: US 8,118,120 B2
(45) Date of Patent: Feb. 21, 2012

(54) POWER WHEEL CHAIR

(75) Inventors: Michael J. Flowers, Mantua, NJ (US); Jordan M. Flowers, Philadelphia, PA (US)

(73) Assignee: Flowers IP LLC, Mantua, NJ (US)

( * ) Notice: Subject to any disclaimer, the term of this patent is extended or adjusted under 35 U.S.C. 154(b) by 0 days.

(21) Appl. No.: 12/584,418

(22) Filed: Sep. 4, 2009

(65) Prior Publication Data

US 2010/0126793 A1 May 27, 2010

Related U.S. Application Data

(63) Continuation-in-part of application No. 12/454,751, filed on May 22, 2009.

(60) Provisional application No. 61/128,556, filed on May 22, 2008.

(51) Int. Cl.
*B60K 1/00* (2006.01)

(52) U.S. Cl. ...................... 180/19.1; 180/19.2; 180/19.3

(58) Field of Classification Search ......... 180/19.1–19.3
See application file for complete search history.

(56) References Cited

U.S. PATENT DOCUMENTS

| | | | | |
|---|---|---|---|---|
| 3,213,957 | A * | 10/1965 | Wrigley | 180/208 |
| 5,125,468 | A * | 6/1992 | Coker | 180/13 |
| 5,771,988 | A * | 6/1998 | Kikutani et al. | 180/65.51 |
| 5,927,414 | A * | 7/1999 | Kan et al. | 180/19.3 |
| 6,003,627 | A * | 12/1999 | Ishida | 180/206 |
| 6,009,964 | A * | 1/2000 | Ishida | 180/6.5 |
| 6,095,269 | A * | 8/2000 | Hosaka et al. | 180/65.6 |
| 6,588,523 | B2 * | 7/2003 | Heimbrock et al. | 180/65.51 |
| 6,702,051 | B2 * | 3/2004 | Chu et al. | 180/13 |
| 6,840,340 | B2 * | 1/2005 | Inoue et al. | 180/19.3 |
| 6,902,019 | B2 * | 6/2005 | Heimbrock et al. | 180/65.51 |
| 6,910,543 | B2 * | 6/2005 | Kanno et al. | 180/65.1 |
| 7,011,172 | B2 * | 3/2006 | Heimbrock et al. | 180/65.51 |
| 7,530,412 | B2 * | 5/2009 | Heimbrock et al. | 180/65.1 |
| 7,789,187 | B2 * | 9/2010 | Zerhusen et al. | 180/323 |
| 7,828,092 | B2 * | 11/2010 | Vogel et al. | 180/19.3 |
| 2006/0243500 | A1 * | 11/2006 | Wiff et al. | 180/16 |
| 2007/0045022 | A1 * | 3/2007 | Greig et al. | 180/215 |
| 2007/0278767 | A1 * | 12/2007 | Aubert | 280/642 |
| 2007/0289787 | A1 * | 12/2007 | Wiff et al. | 180/16 |

* cited by examiner

*Primary Examiner* — Joanne Silbermann
*Assistant Examiner* — Michael Stabley
(74) *Attorney, Agent, or Firm* — Frijouf, Rust & Pyle, P.A.

(57) ABSTRACT

A power wheel chair is disclosed having an improved motion control comprising a frame having a seat for transporting an occupant. A right and a left caster wheel are located in proximity to a front frame end. A right and a left drive wheel are located in proximity to a rear frame end. A motor drives the right and left drive wheels through a differential gearbox. A right and a left handle are connected to frame for enabling an attendant to steer the power wheel chair. An electronic control has a control lever located in proximity to one of the right and left handles for enabling the attendant to control the speed and braking of the power wheel chair.

8 Claims, 19 Drawing Sheets

POWER WHEEL CHAIR

CROSS-REFERENCE TO RELATED APPLICATIONS

This application is a continuation-in-part of U.S. patent application Ser. No. 12/454,751 filed May 22, 2009. Application Ser. No. 12/454,751 filed May 22, 2009 claims benefit of U.S. Patent Provisional application No. 61/128,556 filed May 22, 2008. All subject matter set forth in provisional application No. 61/128,556 filed May 22, 2008 and application Ser. No. 12/454,751 filed May 22, 2009 is hereby incorporated by reference into the present application as if fully set forth herein.

BACKGROUND OF THE INVENTION

1. Field of the Invention

This invention relates to vehicles and more particularly to a power wheel chair having an improved motion control.

2. Description of the Related Art

Attendant operated patient transport vehicles may be characterized as either a manual wheelchair type or a powerchair personal mobility vehicle type with a joystick attendant control. Each of these transport vehicles has certain advantages and disadvantages.

A conventional manual wheelchair was not originally designed or intended to be pushed by an attendant or a caregiver. The handles for pushing a conventional manual wheelchair are poorly designed from an ergonomic standpoint for pushing by an attendant or a caregiver. Many attendants and caregivers incur back, neck, leg and carpal tunnel injuries from pushing a conventional manual wheelchair. Since many of the caregivers are spouses of an elderly disabled person, the spouses are at higher risk for heart attacks and accidental falls that can cause serious injury to both the attendant and wheelchair occupant.

The manual brakes of a conventional manual wheelchair are located on the front of the manual wheelchair and designed as parking brakes. Frequently, the attendant/caregiver fails to engage the parking brakes of a conventional manual wheelchair when the occupant is getting on or off of the conventional manual wheelchair that leads to further injuries. Furthermore, since the parking brakes are located on the front of the manual wheelchair, an attendant cannot engage the parking brakes while the wheelchair is in motion such as descending a ramp.

A powerchair personal mobility vehicle typically comprises a short frame having plural drive wheels and plural casters or idler wheels. The plural drive may be either front or the rear drive wheels with the caster or idler wheels providing the stability for the powerchair. The plural drive wheels are independently driven by plural electric motors. The plural electric motors are independently controlled by a control for independently driving the plural electric motors.

A joystick operates the control for controlling both the turning, speed, direction and braking of the powerchair. The turning of the powerchair is accomplished by a differential in speed between the plural independently driven electric motors. The control also enables one of the plural electric motors to have a reverse rotation relative to the other of the plural electric motors. The powerchair personal mobility vehicle is well suited for confined areas such as inside use due to the short frame and the superior turning radius of the plural independently driven electric motors. The short wheelbase provides a reduced turning radius for the personal mobility vehicle for negotiating smaller confined spaces indoors.

A scooter type personal mobility vehicle has been available for use by an occupant. A scooter personal mobility vehicle typically comprises an elongated frame having front wheel and plural rear wheels. The front wheel is pivotably mounted on the front portion of the elongated frame. A tiller and handlebar is provided for pivoting the front wheel for steering the personal mobility vehicle. The plural rear wheels are mounted on a common shaft driven by a single electric motor. The electric motor is controlled by a variable speed control and a forward and reverse located on the handlebar of the scooter. The scooter type personal mobility vehicle is well suited for unconfined areas such as outside use due to the superior ride of the elongated wheelbase of the scooter. The elongated wheelbase provides more stability and a better ride for the scooter personal mobility vehicle.

Typically, the cost of a powerchair personal mobility vehicle is greater than the cost of a scooter personal mobility vehicle due to the cost of plural electric motors in addition to the increased cost of a joystick operated dual-motor differential control relative to the single motor speed control of the scooter personal mobility vehicle.

Some powerchairs of the prior art were available with an optional primary or secondary joystick control for enabling an attendant or a caregiver to operate the powerchair from behind the seat of the powerchair. Unfortunately, it is difficult to operate a joystick of a powerchair vehicle while walking behind the seat of the powerchair. Because of the cost of a secondary joystick and the difficulty in operating the joystick control of the powerchair from behind the seat, the use of these optional attendant joysticks have not find widespread use in the art.

It is an object of the present invention to provide a power wheel chair that overcomes the inadequacies of the prior art vehicles and provides significant advancement in the patient transport art.

Another object of this invention is to provide a power wheel chair with maneuverability commensurate with a powerchair.

Another object of this invention is to provide a power wheel chair at cost significantly less than a powerchair.

Another object of this invention is to provide a power wheel chair with an improved motion control.

Another object of this invention is to provide a power wheel chair with an improved motion control that does not substantially increase the weight of the power wheel chair.

Another object of this invention is to provide a power wheel chair with an improved motion control that is easier to use while walking behind the powered vehicle.

Another object of this invention is to provide a power wheel chair with an improved motion control that is easier to use while walking along a side of the powered vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a power wheel chair having an improved motion control comprising a frame having a right frame section and a left frame section extending between a front frame end and a back frame end. A seat is mounted to the frame for transporting an occupant. A right and a left caster wheel is located in proximity to the front frame end adjacent to the right and left frame sections, respectively. A right and a left drive wheel are located in proximity to the rear frame end adjacent to the right and left frame sections, respectively. A motor drives the right and left drive wheels through a differential gearbox. A right and a left handle are connected to the right and left frame sections, respectively, for enabling an attendant to steer the power wheel chair. An electronic control has a control lever located in proximity to one of the right and left handles for enabling the attendant to control the speed and braking of the power wheel chair.

In a more specific example of the invention, the right and left handles extend generally backwardly from the back frame end. Preferably, the right and left handles extend generally horizontally and backwardly from the back frame end and include a right and a left hand gripping portion. The right and left handles operate in concert with the differential gearbox driving the right and left drive wheels for enabling an attendant to steer the power wheel chair.

In another example of the invention, a journal rotates one of the right and left handles about a generally vertical axis. A journal lock locks the one of the right and left handles about the generally vertical axis. The journal lock locks one of said right and left handles in generally parallel alignment with an axle driving the right and left drive wheels through the differential gearbox. In an alternate example, each of the right and left handles includes a vertical adjustment device for adjusting a vertical position of the right and left handles. A right and a left adjustment lock secures the right and left handles in a vertical position.

In still another example of the invention, the invention relates to a battery cassette receiver secured to the frame. The battery cassette receiver has cassette receiver contacts connected to the frame. A battery cassette has a battery connected to battery cassette contacts. The battery cassette is insertable into the battery cassette receiver for interconnecting the battery cassette contacts with the cassette receiver contacts for powering the power wheel chair.

In a further example of the invention, a remote battery cassette receiver is located remote from the power wheel chair. The remote battery cassette receiver has remote receiver cassette contacts connected to a battery charger. The battery cassette is insertable into the remote battery cassette receiver for interconnecting the battery cassette contacts with the remote cassette receiver contacts for charging the battery.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
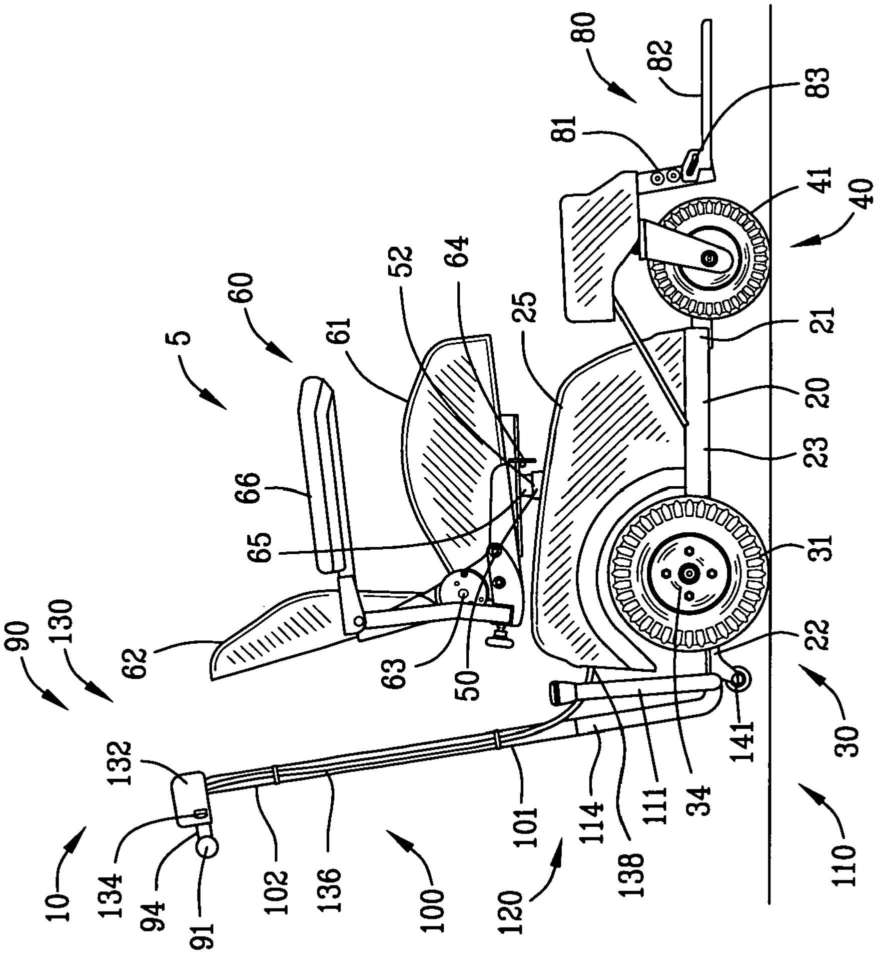
FIG. 1 is a side view of a power wheel chair incorporating an improved motion control of the present invention.
Figure 2:
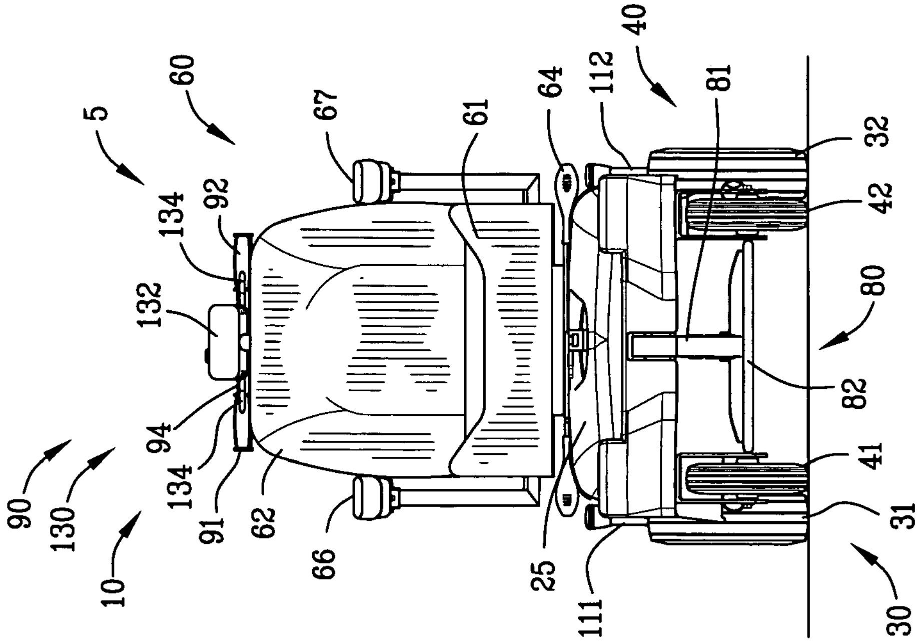
FIG. 2 is a front view of FIG. 1.
Figure 3:
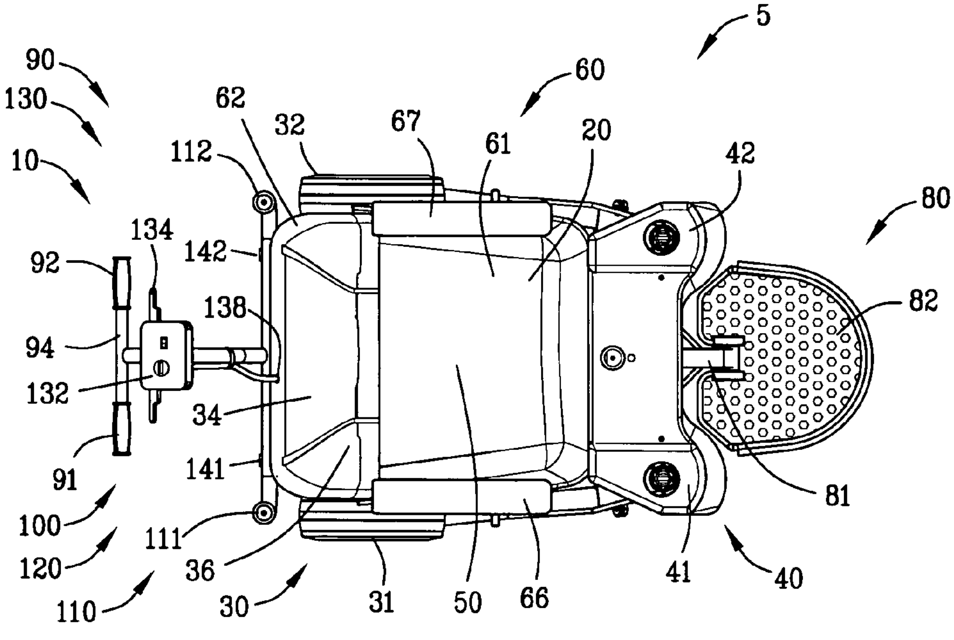
FIG. 3 is a top view of FIG. 1.

FIGS. 1-5 are various views of a power wheel chair 5 incorporating an improved motion control 10 of the present invention. The power wheel chair 5 comprises a frame 20 extending between a first frame end 21 and a second frame end 22. The first frame end 21 and the second frame end 22 define an intermediate frame portion 23 of the frame 20. The frame 20 of the power wheel chair 5 is covered by a covering 25 for overlaying interior portions of the power wheel chair 5 and for enhancing the attractiveness of the power wheel chair 5.

Figure 4:
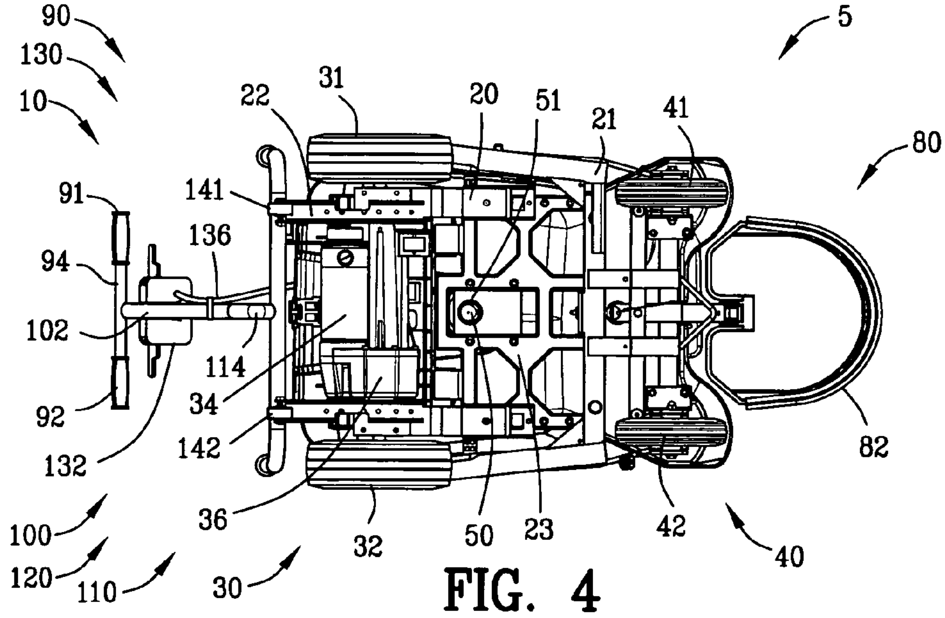
FIG. 4 is a bottom view of FIG. 1.

As best shown in FIG. 4, the power wheel chair 5 comprises a drive wheel assembly 30 comprises a right and a left drive wheel 31 and 32 located in proximity to the second end 22 of the frame 20. A single drive motor 34 drives the right and left drive wheels 31 and 32 through a differential gearbox 36. The differential gearbox 36 enables one of the right and left drive wheels 31 and 32 to rotate faster than the other of the right and left drive wheels 31 and 32 during a turn of the power wheel chair 5 as should be well known to those skilled in the art.

A caster wheel assembly 40 is located in proximity to the first frame end 21 of the frame 20. The caster wheel assembly 40 comprises a right and a left caster wheel 41 and 42. The right and left caster wheels 41 and 42 are shown as right and left caster wheels mounted by swivels to the first frame end 21 of the frame 20.

A pedestal 50 extends between a lower end 51 and an upper end 52 in a substantially vertical orientation. The lower end 51 of the pedestal 50 is secured to the intermediate frame end 33 of the frame 20. An upper end 52 of the pedestal 50 extends upwardly for supporting a chair assembly 60. The upper end 52 of the pedestal 50 defines an internal aperture 55 within the pedestal 50

The chair assembly 60 comprises a chair portion 61 and a backrest portion 62. In this example, the backrest portion 62 is pivotally mounted to the chair portion 61 by a pivot 63 for accommodating for the size and comfort of an occupant.

The chair assembly 60 is rotatably mounted on the pedestal 50 with the rotation of the chair assembly 60 being controlled by a lever 64. The chair assembly 60 includes a rotation shaft 65 receivable within the internal aperture 65 of the pedestal 50 for rotatably mounting chair assembly 60 on the pedestal 50. The rotation of the chair assembly 60 facilitates the ingress and egress of an occupant 70 from the power wheel chair 5. Plural armrests 66 and 67 are secured to the chair portion 61 of the chair assembly 60. A rotational chair assembly 60 suitable for use with the present invention is more fully set forth in U.S. Pat. No. 6,361,111 which is incorporated by reference into the present application.

A footrest assembly 80 is located on the first end 21 of the frame 20. The footrest assembly 80 comprises a footrest base 81 secured to the first end 21 of the frame 20. A footrest plate 82 mounted to the footrest base 81 by a pivot 83 enabling the footrest plate 82 to be pivoted between a operative position, wherein the first footrest plate 82 is disposed in a generally horizontal position as shown in FIG. 1 and an inoperative position wherein the footrest plate 82 is disposed in a generally vertical position (not shown). The footrest plate 82 provides a footrest for the occupant 70.

A steering bar 90 is secured to the power wheel chair 5 for controlling the turning direction and speed of the power wheel chair 5. In this embodiment, the steering bar 90 comprises a right end 91 and a left end 92 defining a handlebar 94. An upstanding portion 100 extends between a lower end 101 and an upper end 102. The handlebar 94 is secured to the upper end 102 of the upstanding portion 100 with the right and left ends 91 and 92 extending outwardly therefrom. The lower end 101 of the upstanding portion 100 is secured to a frame mounting 110 through a coupling 120. The right and left end 91 and 92 of the handlebar 94 are fixed relative to the frame 20 for enabling the attendant 72 to turn the power wheel chair 5.

An electronic control 130 includes a control console 132 having a control lever 134 located on the steering bar 90 for controlling the speed and direction of the drive motor 34. Preferably, the electronic control 130 incorporates a forward direction speed function, a reverse direction speed function, as well as, a braking function of the drive motor 34.

The frame mounting 110 comprises a first and a second attachment member 111 and 112 secured to the second end 22 of the frame 20. An intermediate member 113 interconnects the first and second attachment members 111 and 112. The intermediate member 113 supports the coupling 120 for connecting the steering bar 90 to the power wheel chair 5.

The coupling 120 comprises a lower coupling portion 121 and an upper coupling portion 122. The lower coupling portion 121 is secured to the intermediate member 113 of the frame mounting 110 whereas the upper coupling portion 122 is defined in the lower end 101 of the upstanding member 100.

Figure 6:
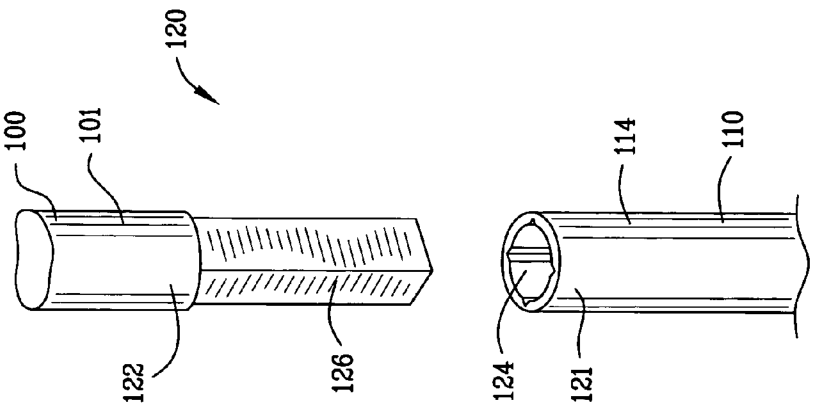
FIG. 6 is an enlarged isometric view of a frame coupling for connecting a steering and control bar to the power wheel chair.
Figure 5:
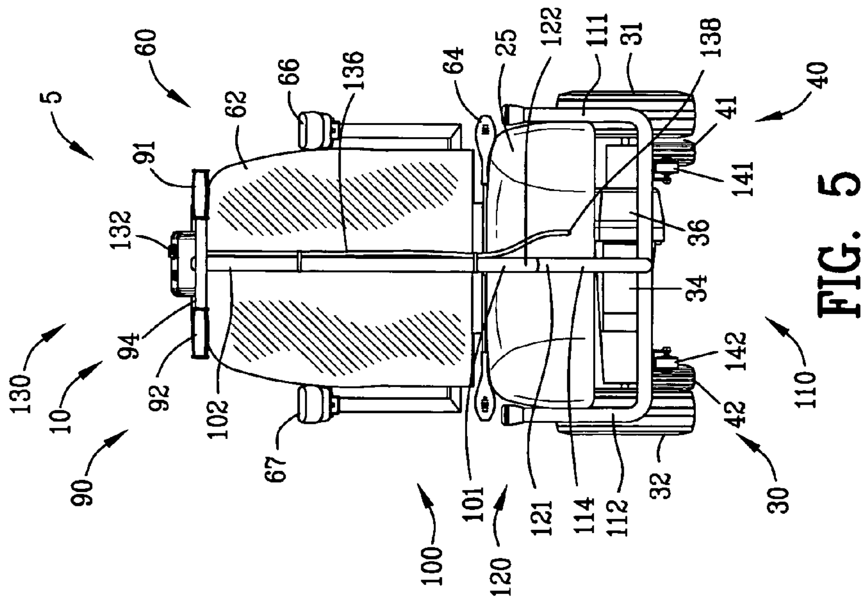
FIG. 5 is a rear view of FIG. 1.

FIG. 6 is an enlarged isometric view of the coupling 120 for connecting the steering bar 90 to the power wheel chair 5. In this example, the lower coupling portion 121 comprises a keyed aperture 124 whereas the upper coupling portion 122 comprises a keyed insert 126. The keyed insert 126 is insertable into the keyed aperture 124 for connecting the steering bar 90 to the power wheel chair 5. Although the coupling 120 has been shown as a keyed aperture 124 and a keyed insert 126, it should be appreciated by those skilled in the art that various types of coupling may be used connecting the steering bar 90 to the power wheel chair 5.

Figure 7:
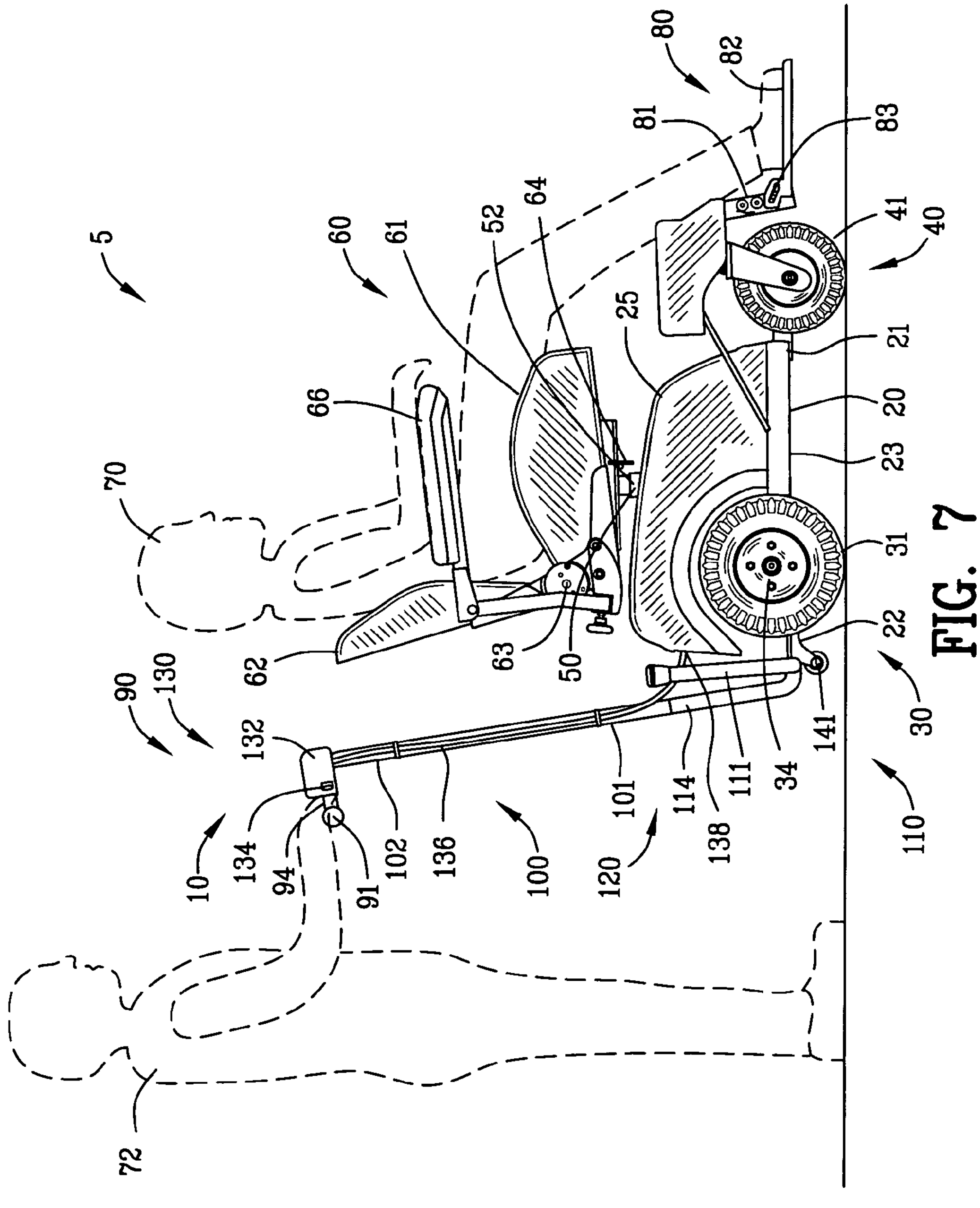
FIG. 7 is a side view similar to FIG. 1 illustrating an occupant seated in the power wheel chair with an attendant controlling the power wheel chair.

FIG. 7 is a side view similar to FIG. 1 illustrating an occupant 70 seated in the power wheel chair 5 with an attendant 72 controlling the speed, direction and braking of the power wheel chair 5.

Figure 7A:
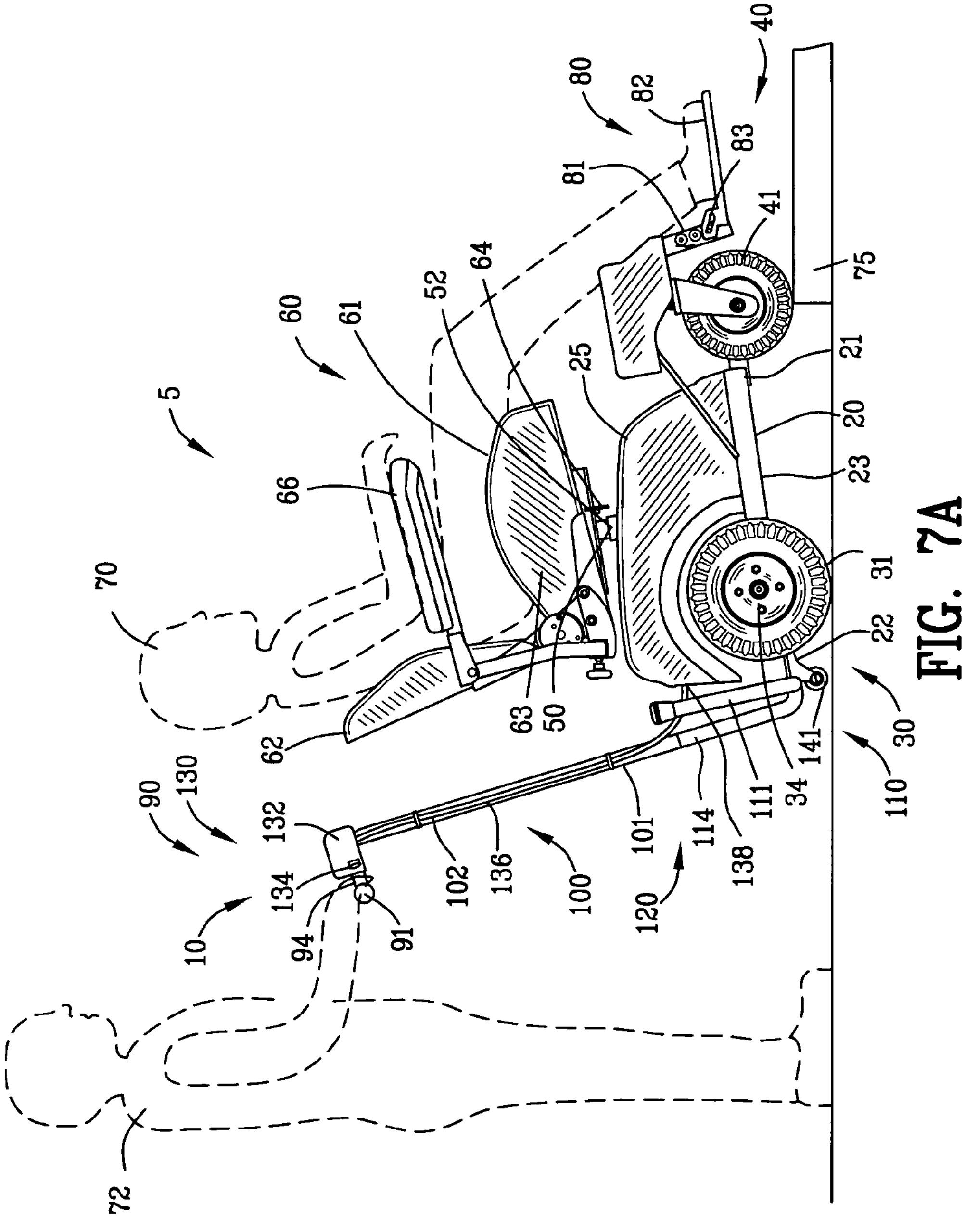
FIG. 7A is a side view similar to FIG. 7 illustrating the tilting of the power wheel chair with the steering bar for overcoming an elevated obstruction shown as a curb.

FIG. 7A is a side view similar to FIG. 7 illustrating the tilting of the power wheel chair 5 with the steering bar 90 for overcoming an elevated obstruction 75 such as a curb and the like. The attendant 72 push downwardly on the steering bar 90 for rotating the power patient transport vehicle 5 about the drive wheels 31 and 32. The rotation of the power patient transport vehicle 5 about the drive wheels 31 and 32 raises the caster wheels 41 and 42 above the height of the elevated obstruction 75. Once the caster wheels 41 and 42 have been raised above the level of the elevated obstruction 75, the power wheel chair 5 may be powered over the elevated obstruction 75 through the powered drive wheels 31 and 32. Rear caster wheels 141 and 142 are provided for limiting the rotation of the power patient transport vehicle 5 about the drive wheels 31 and 32. In one example, rear caster wheels 141 and 142 positions 1 inch above a ground surface permits a raising of the caster wheels 41 and 42 of 3 inches above a ground surface. This type of overcoming an elevated obstruction 75 is impossible for either a scooter or a powerchair personal mobility vehicle without significant discomfort for the occupant.

Figure 8:
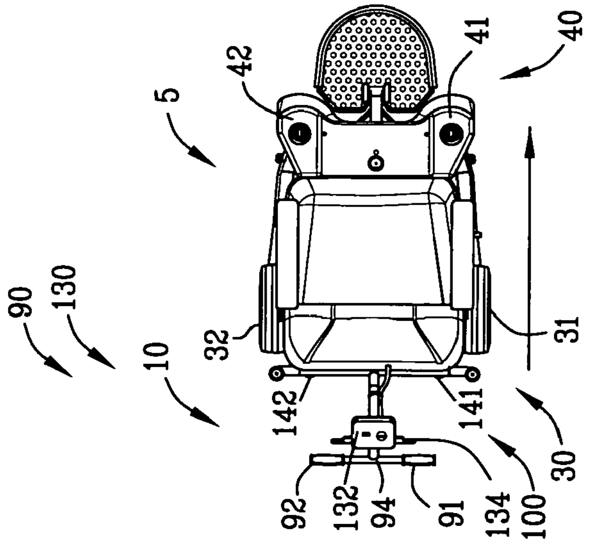
FIG. 8 is a top view of the power wheel chair of FIGS. 1-7 illustrating equal forces applied to the steering bar of the power wheel chair for directing the personal mobility vehicle in a straight direction.

FIG. 8 is a top view of the power wheel chair 5 of FIGS. 1-7 illustrating equal forces applied to the handlebar 94 of the power wheel chair 5 by the attendant 72 for directing the power wheel chair 5 in a straight direction.

Figure 9:
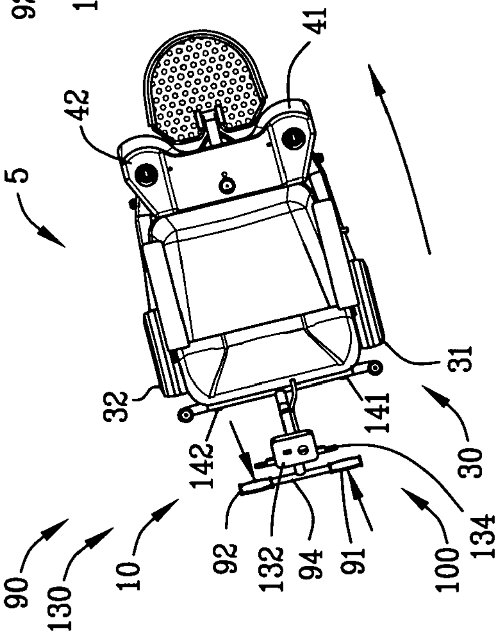
FIG. 9 is a top view similar to FIG. 8 illustrating unequal forces applied to the steering bar of the power wheel chair for turning the power wheel chair.

FIG. 9 is a top view similar to FIG. 8 illustrating unequal forces applied to the handlebar 94 of the power wheel chair 5 by the attendant 72 for turning the power wheel chair 5.

Figure 10:
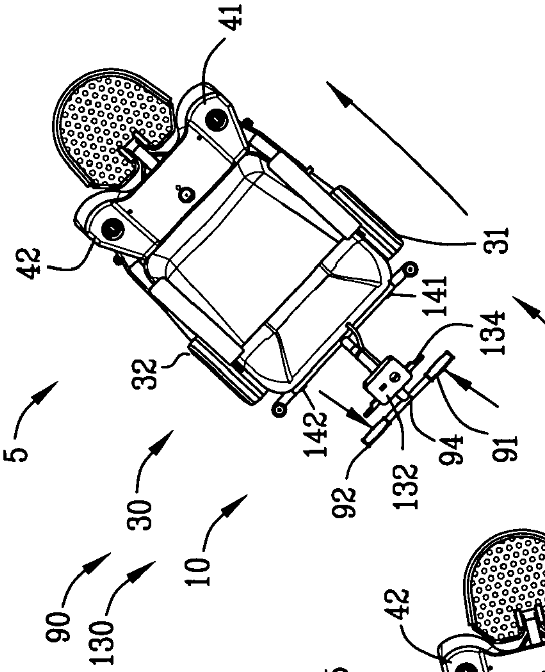
FIG. 10 is a top view similar to FIG. 9 illustrating continued unequal forces applied to the steering bar of the power wheel chair for continued turning the power wheel chair.

FIG. 10 is a top view similar to FIG. 9 illustrating continued unequal forces applied to the handlebar 94 of the power wheel chair 5 by the attendant 72 for continued turning the power wheel chair 5.

Figure 11:
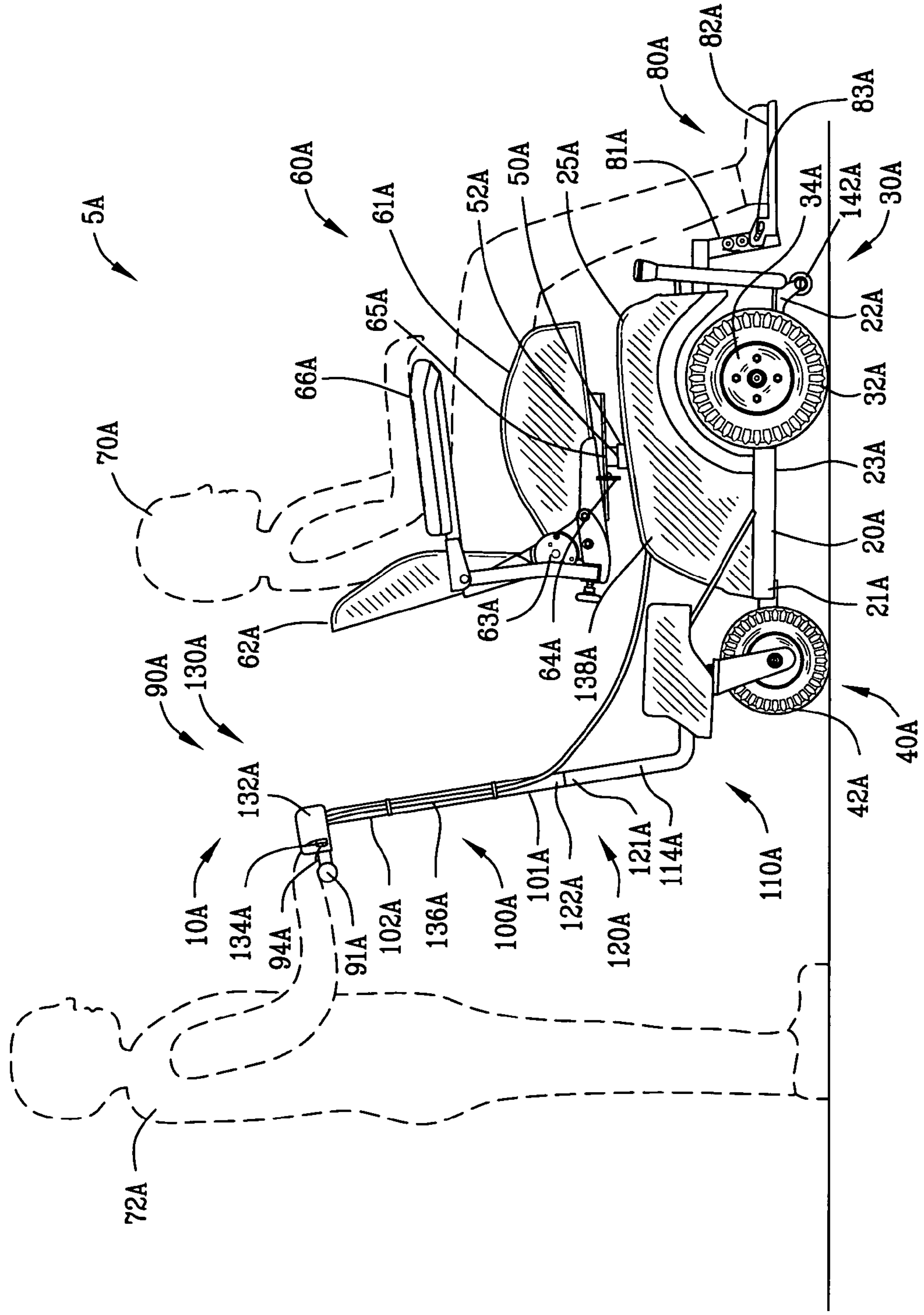
FIG. 11 is a side view of a second embodiment of a power wheel chair incorporating an improved motion control of the present invention.

FIG. 11 is a side view of a second embodiment of a power wheel chair 5A incorporating an improved motion control 10A of the present invention. In this example, the power wheel chair 5A comprises a frame 20A extending between a first frame end 21A and a second frame end 22A. A drive wheel assembly 30A comprises a right and left drive wheel 31A and 32A located in proximity to the second end 22A of the frame 20. A caster wheel assembly 40A comprising a right and a left caster wheel 41A and 42A is located in proximity to the first frame end 21A of the frame 20A. The steering bar 90A is secured to in proximity to the first end 21A of the frame 20A.

The steering bar 90A is mounted to the first frame end 21A of the frame 20A through an upstanding portion 100A and a frame mounting 110A through a coupling 120A in a manner similar to FIGS. 1-6. The second embodiment of a power wheel chair 5A provides a front wheel drive in contrast to the rear wheel drive shown in FIGS. 1-6.

The front wheel drive power wheel chair 5A shown in FIG. 11 is shown in FIG. 1. In addition, the front wheel drive power wheel chair 5A has more traction and accommodates larger obstacles such as larger curbs and larger bumps than the rear wheel drive power wheel chair 5. In contrast, the rear wheel drive power wheel chair 5 has better maneuverability than a front wheel drive power wheel chair 5A. Accordingly, the front wheel drive power wheel chair 5A is generally more suitable for outdoor use whereas the rear wheel drive power wheel chair 5 is generally more suitable for indoor use.

Figure 13:
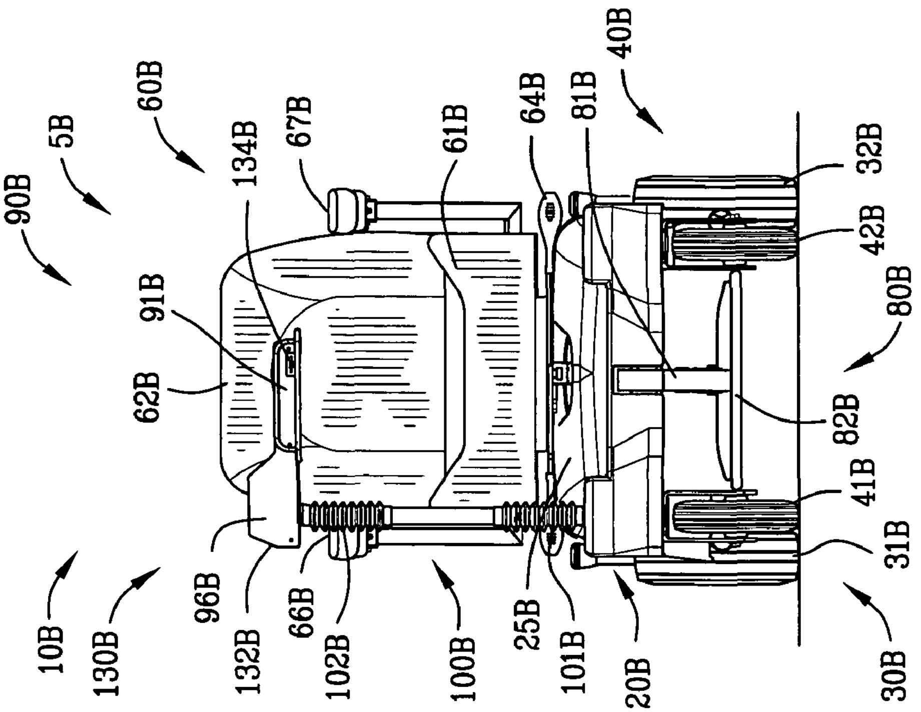
FIG. 13 is a front view of FIG. 12.
Figure 12:
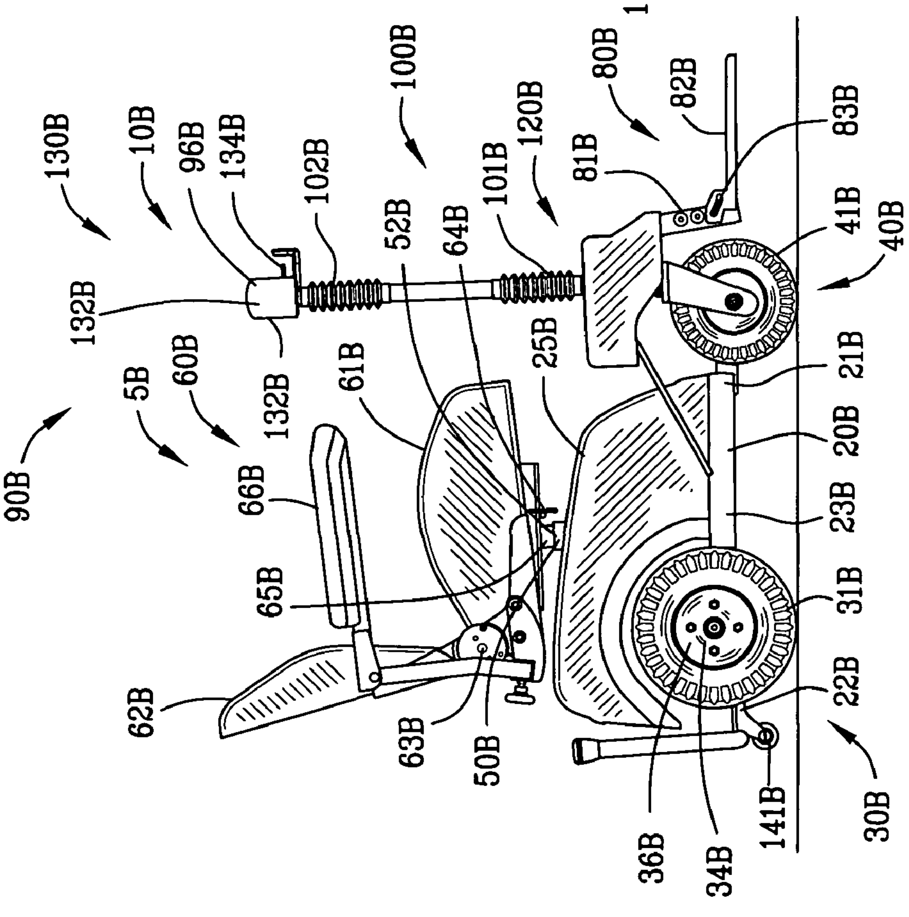
FIG. 12 is a side view of a third embodiment of a power wheel chair incorporating an improved motion control of the present invention.
Figure 14:
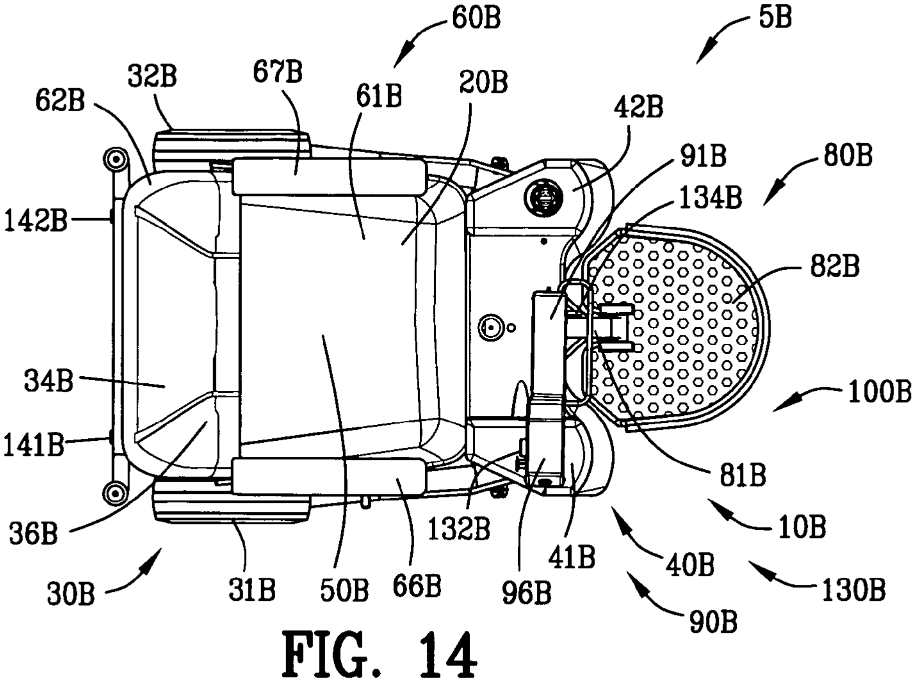
FIG. 14 is a top view of FIG. 12

FIGS. 12-14 are various views of a third embodiment of a power wheel chair 5B incorporating an improved motion control 10B of the present invention. The power wheel chair 5B comprises a frame 20B extending between a first frame end 21B and a second frame end 22B. A drive wheel assembly 30B comprises a right and a left drive wheel 31B and 32B located in proximity to the second end 22B of the frame 20B. A single drive motor 34B drives the right and left drive wheels 31B and 32B through a differential gearbox 36B in a manner similar to FIGS. 1-6. A caster wheel assembly 40B is located in proximity to the first frame end 21B of the frame 20B. The caster wheel assembly 40B comprises a right and a left caster wheel 41B and 42B. The right and left caster wheels 41B and 42B are shown as right and left caster wheels mounted by swivels to the first frame end 21B of the frame 20B.

A steering bar 90B is secured to the power wheel chair 5B for controlling the power wheel chair 5B. In this embodiment, the steering bar 90B comprises a hand gripping portion 91B defining a tiller 96B. An upstanding portion 100B extends between a lower end 101B and an upper end 102B. The tiller 96B is secured to the upper end 102B of the upstanding portion 100B with the hand gripping portion 91B extending outwardly therefrom. The lower end 101B of the upstanding portion 100B is secured one of the right and left casters 41B and 42B through a coupling 120B. The tiller 96B is fixed relative to the one of the right and left casters 41B and 42B for enabling the occupant 70B to turn the power wheel chair 5B.

An electronic control 130B includes a control console 132B having a control lever 134B located on the tiller 96B for controlling the speed, direction and braking of the drive motor 34B. Preferably, the electronic control 130 incorporates a forward direction speed function, a reverse direction speed function as well as a braking function of the drive motor 34B.

Figure 15:
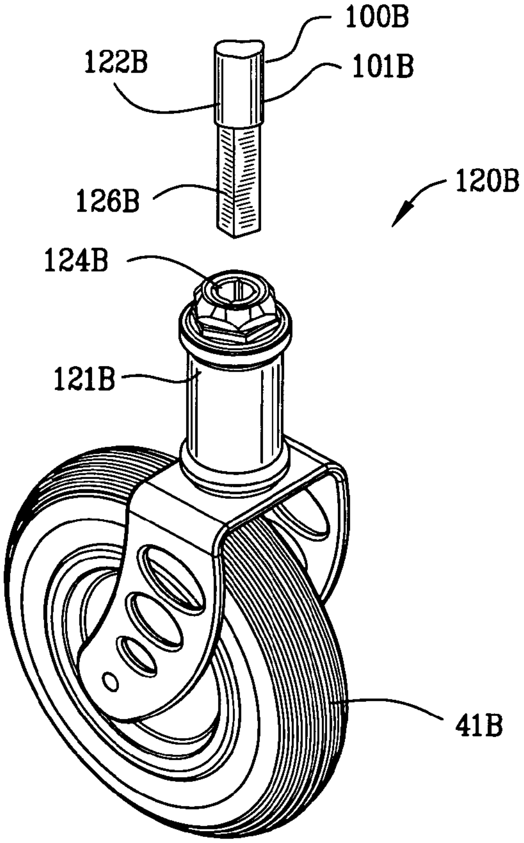
FIG. 15 is an enlarged isometric view of a caster coupling for connecting a tiller to a caster of the power wheel chair.

FIG. 15 is an enlarged isometric view the right caster wheels 41B and a caster coupling 120B for connecting the steering bar 90B to the right caster wheels 41B. The caster coupling 120B comprises a lower coupling portion 121B and an upper coupling portion 122B. The lower coupling portion 121B is secured to the right caster wheels 41B whereas the upper coupling portion 122B is defined in the lower end 101B of the upstanding member 100B.

In this example, the lower coupling portion 121B comprises a keyed aperture 124B whereas the upper coupling portion 122B comprises a keyed insert 126B. The keyed insert 126B is insertable into the keyed aperture 124B for connecting the steering bar 90B to the power wheel chair 5B.

Figure 16:
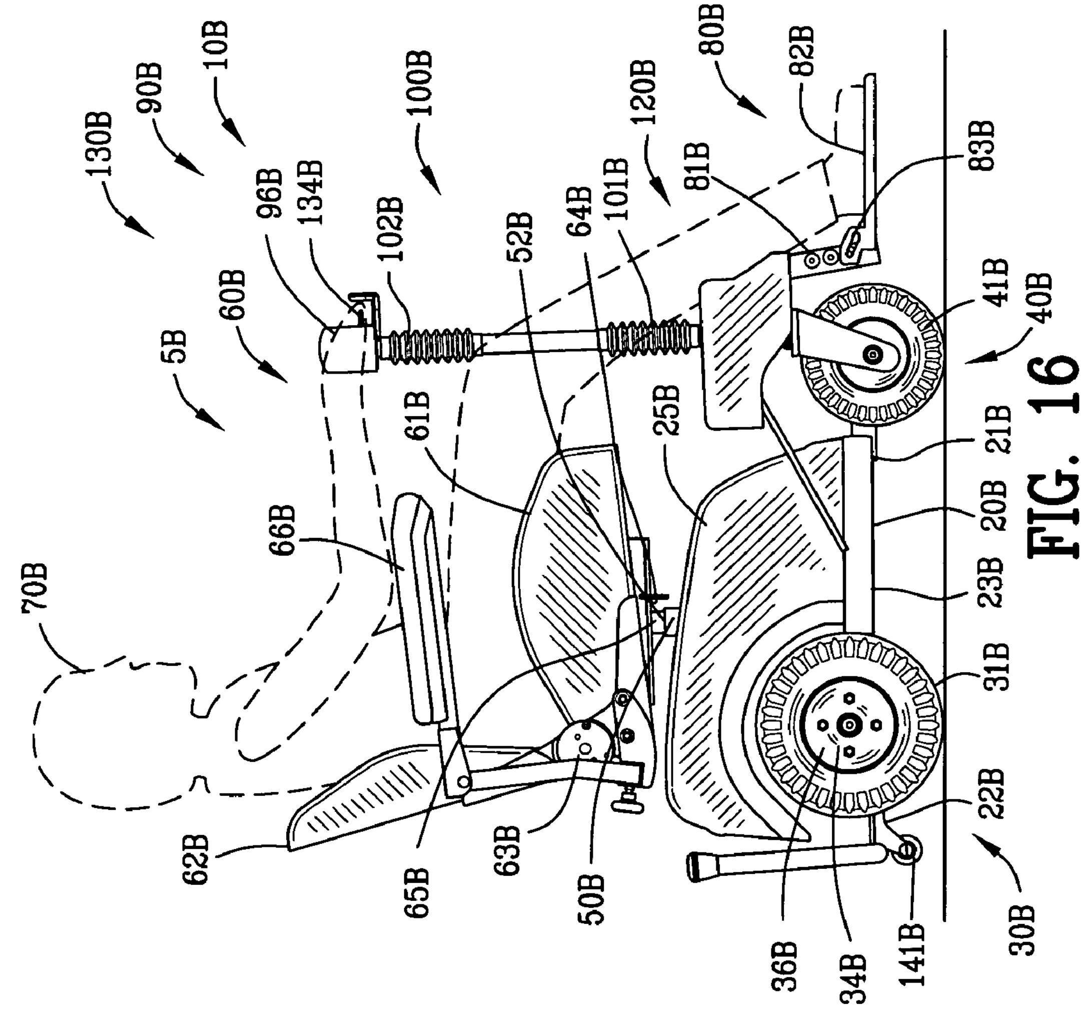
FIG. 16 is a side view similar to FIG. 12 illustrating an occupant seated in the power wheel chair with the occupant controlling the power wheel chair.

FIG. 16 is a side view similar to FIG. 12 illustrating an occupant 70B seated in the power wheel chair 5B with the occupant 70B controlling the power wheel chair 5B.

Figure 17:
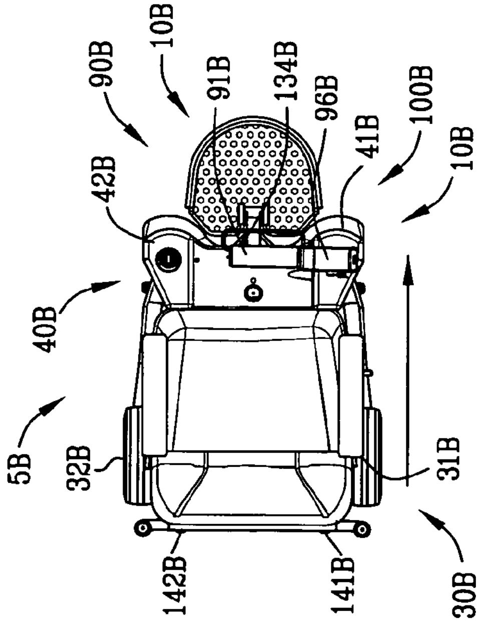
FIG. 17 is a top view of the power wheel chair of FIGS. 12-16 illustrating neutral force applied to the tiller of the power wheel chair for directing the power wheel chair in a straight direction.

FIG. 17 is a top view of the power wheel chair 5B of FIGS. 12-16 illustrating neutral force applied to the steering bar 90B of the power wheel chair 5B by the occupant 70B for directing the power wheel chair 5B in a straight direction.

Figure 18:
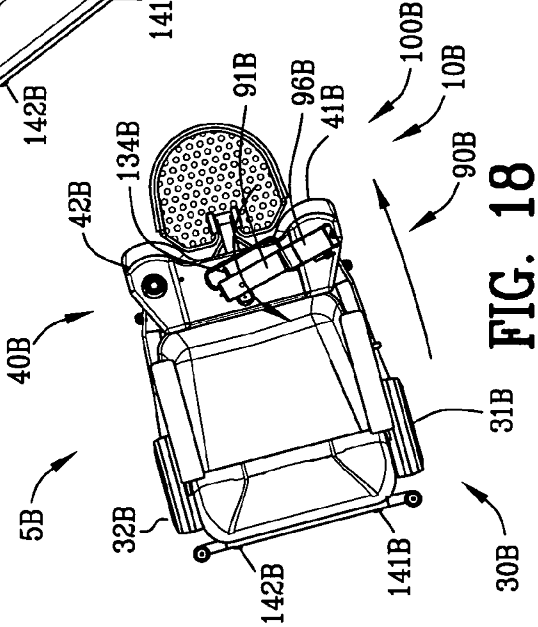
FIG. 18 is a top view similar to FIG. 17 illustrating a rotational force applied to the tiller of the power wheel chair for turning the power wheel chair.

FIG. 18 is a top view similar to FIG. 17 illustrating a rotational force applied to the steering bar 90B of the power wheel chair 5B by the occupant 70B for turning the power wheel chair 5B.

Figure 19:
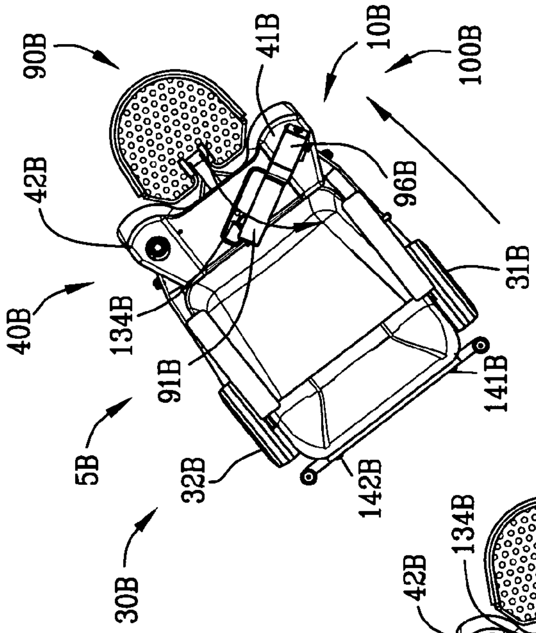
FIG. 19 is a top view similar to FIG. 18 illustrating a continued rotational force applied to the tiller of the power wheel chair for continued turning the power wheel chair.

FIG. 19 is a top view similar to FIG. 18 illustrating a continued rotational force applied to the steering bar 90B of the power wheel chair 5B by the occupant 70B for continued turning the power wheel chair 5B.

FIGS. 20-23 are various views of a power wheel chair 205 incorporating an improved motion control 210 of the present invention. The power wheel chair 205 comprises a frame 220 extending between a front frame end 221 and a back frame end 222. The front frame end 221 and the back frame end 222 define an intermediate frame area 223 of the frame 220. The frame 210 has a right frame section 225 and a left frame section 226 extending between the front frame end 221 and the back frame end 222. The frame 220 includes a right and a left upstanding portion 227 and 228.

The power wheel chair 205 comprises a drive wheel assembly 230 having a right and a left drive wheel 231 and 232 located adjacent to the right and left frame sections 225 and 226 and in proximity to the back frame end 222 of the frame 220. The right and left drive wheels 231 and 232 are mounted on right and left axles 233 and 234. A single drive motor 235 drives the right and left drive wheels 231 and 232 through a differential gearbox 236. The differential gearbox 236 enables one of the right and left drive wheels 231 and 232 to rotate faster than the other of the right and left drive wheels 231 and 232 during a turn of the power wheel chair 205 as should be well known to those skilled in the differential gearbox art.

A caster wheel assembly 240 is located in proximity to the front frame end 221 of the frame 220. The caster wheel assembly 240 comprises a right and a left caster wheel 241 and 242 mounted in axles 243 and 244 located adjacent to the right and left frame sections 225 and 226. A right and a left swivel 245 and 246 rotatably mount the right and left caster wheels 241 and 242 to the front frame end 221 of the frame 220.

The chair assembly 260 comprises a chair portion 261 and a backrest portion 262 for accommodating an occupant as previously shown. The chair assembly 260 includes a right and a left armrest 263 and 264 are secured to the chair portion 261 of the chair assembly 260.

Figure 21:
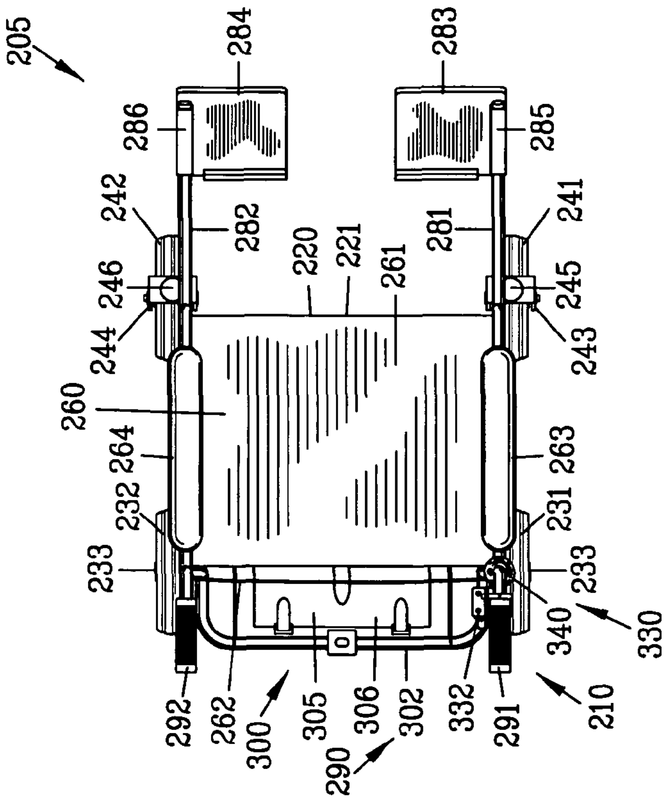
FIG. 21 is a top view of FIG. 20.
Figure 20:
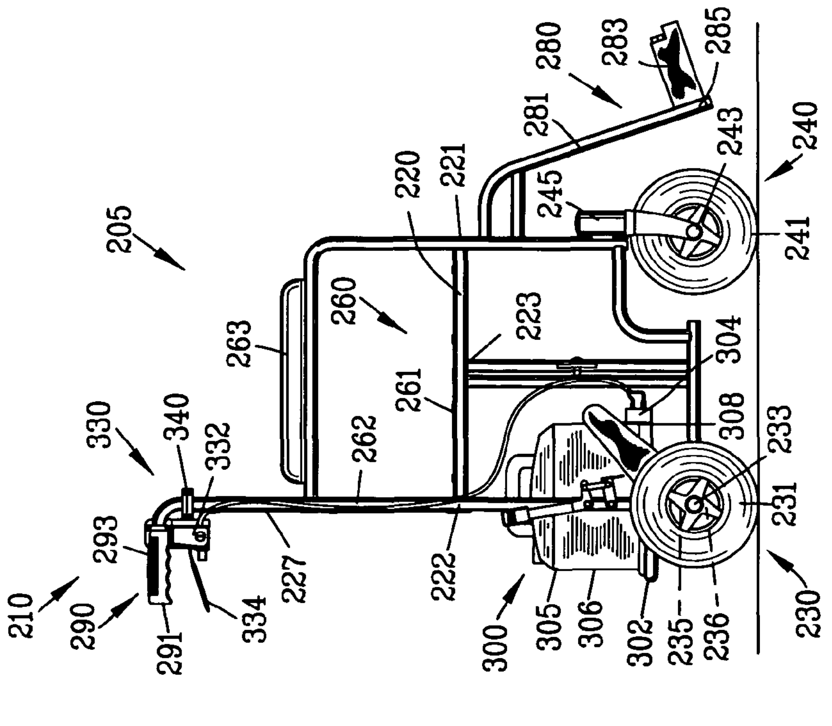
FIG. 20 is a side view of a fourth embodiment of a power wheel chair incorporating an improved motion control of the present invention.

A footrest assembly 280 is located on the front end 221 of the frame 220. The footrest assembly 280 comprises a right and a left footrest base 281 and 282 secured to the first end 221 of the frame 220. A right and a left footrest plate 283 and 284 are mounted to the right and left footrest bases 281 and 282 by right and left pivots 285 and 286 enabling the right and left footrest plates 283 and 284 to be pivoted between a operative position, wherein the right and left footrest plates 283 and 284 are disposed in an operative position as shown in FIGS. 20 and 21 and an inoperative position wherein the right and left footrest plates 283 and 284 are disposed in a generally vertical position (not shown). The right and left footrest plates 283 and 284 provide a footrest for the occupant (not shown).

A steering handle assembly 290 is secured to the power wheel chair 205 for controlling the turning direction and speed of the power wheel chair 205. In this embodiment, the steering handle assembly 290 comprises a right handle 291 and a left handle 292 connected to the right and left frame sections 225 and 226, respectively. The right and left handles extend generally backwardly from the back frame end 222. Preferably, the right and left handles 291 and 292 extend generally horizontally and backwardly from the back frame end 222 and include a right and a left hand gripping portion 293 and 294. The right and left handles 291 and 292 operate in concert with the differential gearbox 236 driving the right and left drive wheels 231 and 232 for enabling an attendant as previously shown to steer the power wheel chair 205.

Figure 22:
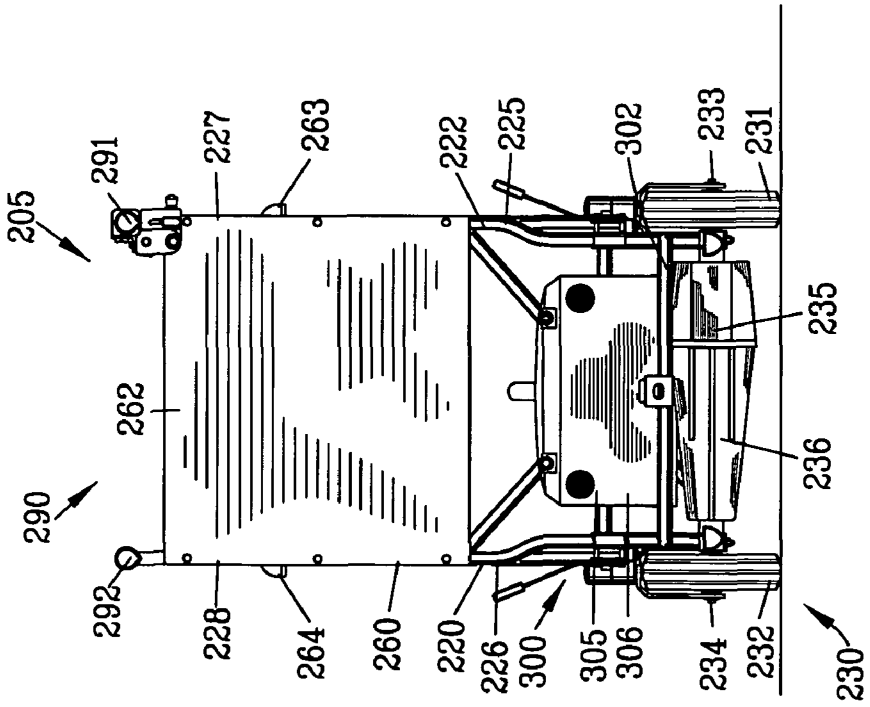
FIG. 22 is a rear view of FIG. 20.

FIG. 22 is rear view of the power wheel chair 205 of FIGS. 20 and 21. A battery assembly 300 is secured to the frame 220. The battery assembly 300 comprises a battery cassette receiver 302 having cassette receiver contacts 304. A battery cassette 305 has a battery 306 connected to battery cassette contacts 308. The battery cassette 305 is insertable into the battery cassette receiver 302 for interconnecting the battery cassette contacts 308 with the cassette receiver contacts 304 for powering the power wheel chair 205.

Figure 23:
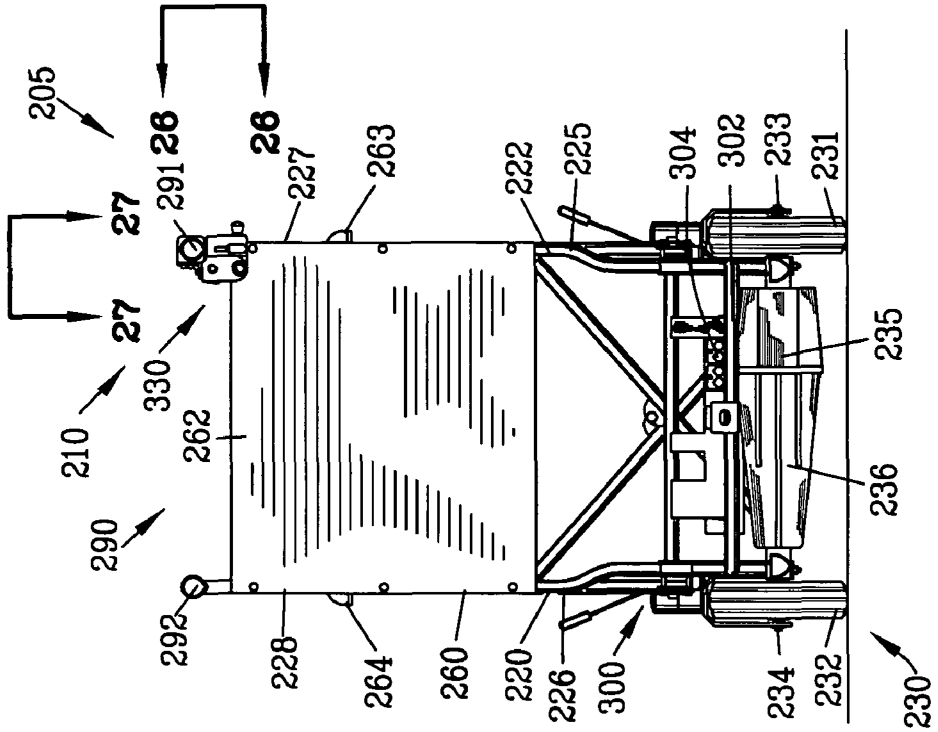
FIG. 23 is a rear view similar to FIG. 22 with a battery cassette removed.

FIG. 23 is rear view of the power wheel chair 205 similar to FIG. 22 with the battery cassette 305 removed from the power wheel chair 205. The battery cassette 305 is removable from the battery cassette receiver 302 for charging the battery 306 at a remote location from the power wheel chair 205.

Figure 24:
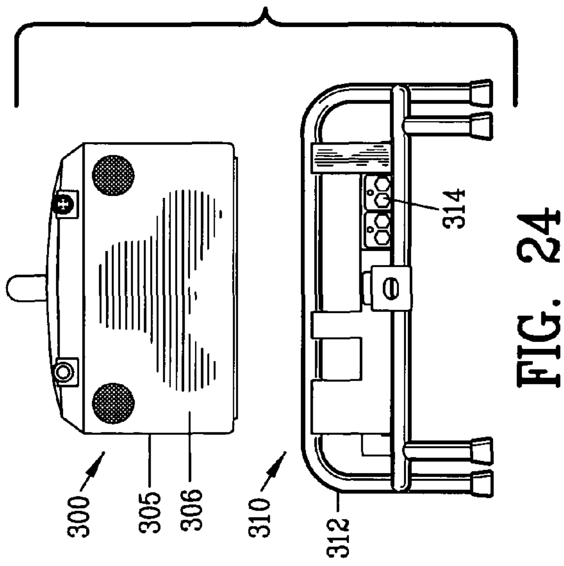
FIG. 24 is an enlarged view of the removed battery cassette positioned adjacent to a remote charging assembly.

FIG. 24 is an enlarged view of the removed battery cassette 305 positioned adjacent to a remote charging assembly 310. The remote charging assembly 310 comprises a remote battery cassette receiver 312 having remote receiver cassette contacts 314 connected to a conventional battery charger (not shown).

Figure 25:
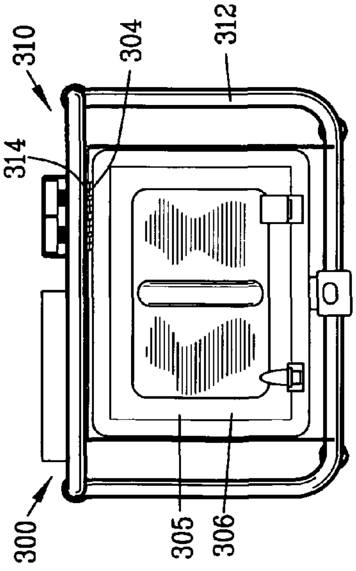
FIG. 25 is an enlarged view of the removed battery cassette being charged by the remote charging assembly.

FIG. 25 is an enlarged view of the removed battery cassette 305 being charged by a remote charger. The battery cassette 305 is insertable into the remote battery cassette receiver 312 for interconnecting the battery cassette contacts 308 with the remote cassette receiver contacts 314 for charging the battery 306.

Figure 26:
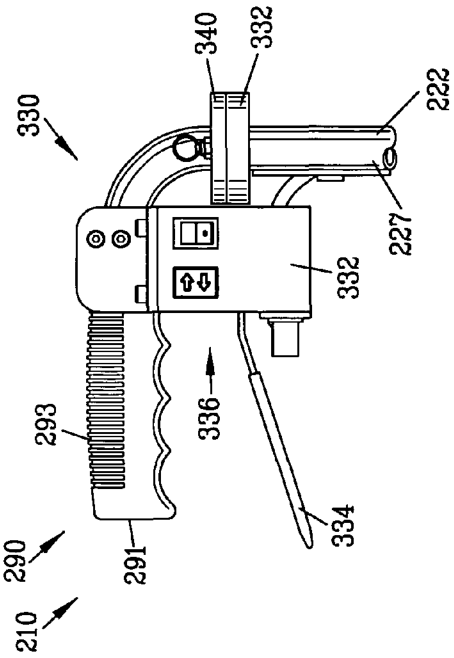
FIG. 26 is an enlarged view along line 26-26 in FIG. 23.
Figure 27:
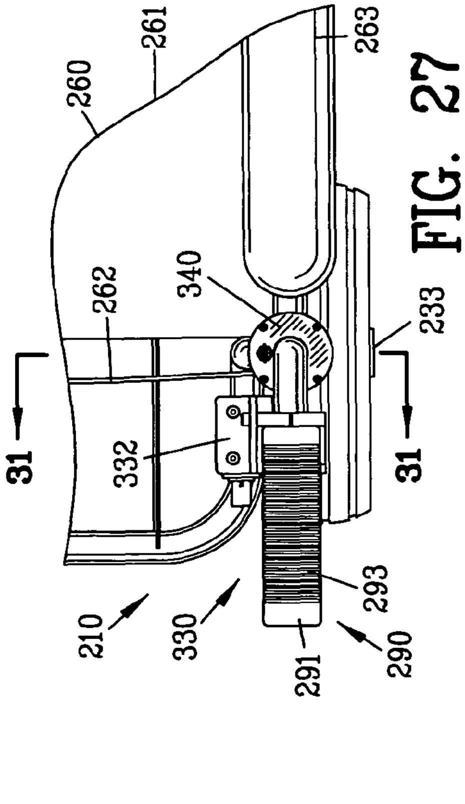
FIG. 27 is an enlarged view along line 27-27 in FIG. 23 illustrating the right handle of the power wheel chair located in first rotational position.

FIGS. 26 and 27 are enlarged views of FIG. 23 illustrating an electronic control 330 for controlling the drive motor 235. The electronic control 330 includes a control console 332 having a control lever 334 and switches 336 located on the right handle 291 for controlling the speed and direction of the drive motor 235. Preferably, the electronic control 230 incorporates a forward direction speed function, a reverse direction speed function, as well as, a braking function of the drive motor 235.

FIG. 27 is an enlarged view along line 27-27 in FIG. 23 illustrating the right handle 291 of the power wheel chair 205 located in first rotational position. The first rotational position aligns the right handle 291 generally backwardly and perpendicular to the right axles 233.

Figure 28:
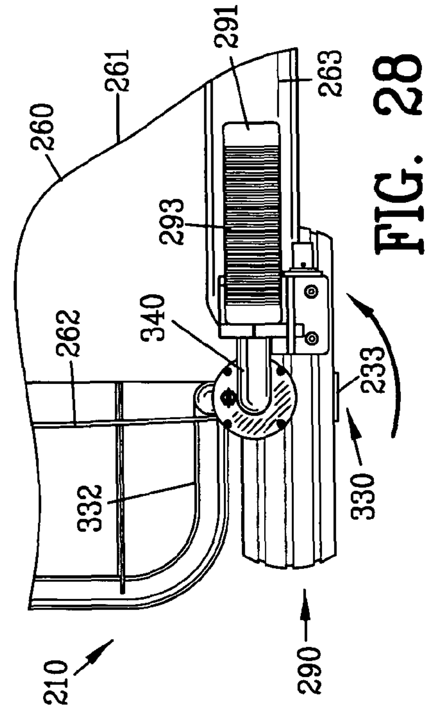
FIG. 28 is a top view similar to FIG. 27 illustrating the right handle of the power wheel chair located in second rotational position.

FIG. 28 is a top view similar to FIG. 27 illustrating the right handle 291 of the power wheel chair 205 located in second rotational position. The second rotational position aligns the right handle 291 generally forwardly and perpendicular to the right axles 233.

Figure 29:
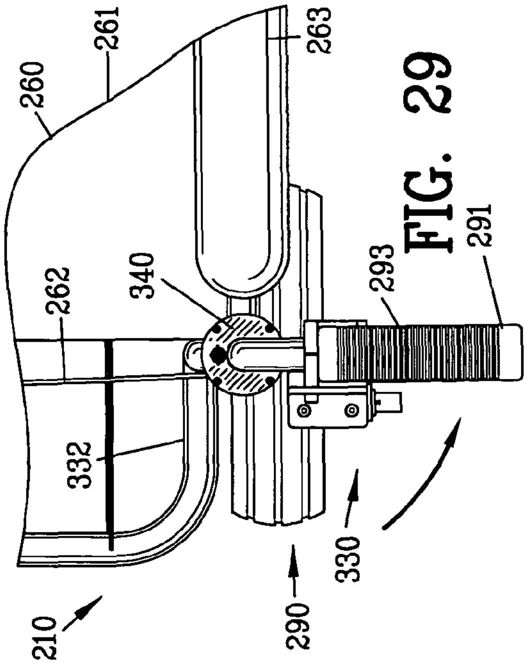
FIG. 29 is a top view similar to FIG. 27 illustrating the right handle of the power wheel chair located in third rotational position.

FIG. 29 is a top view similar to FIG. 27 illustrating the right handle 291 of the power wheel chair 205 located in third rotational position. The third rotational position aligns the right handle 291 generally outwardly and parallel to the right axles 233.

Figure 30:
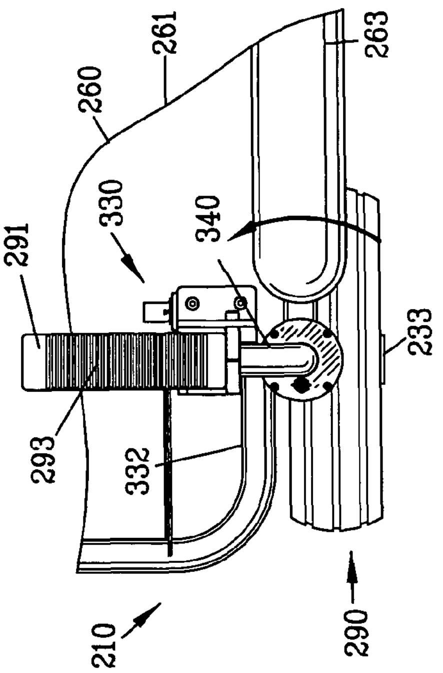
FIG. 30 is a top view similar to FIG. 27 illustrating the right handle of the power wheel chair located in fourth rotational position.

FIG. 30 is a top view similar to FIG. 27 illustrating the right handle 291 of the power wheel chair 205 located in fourth rotational position. The fourth rotational position aligns the right handle 291 generally inwardly and parallel to the right axles 233.

Figure 31:
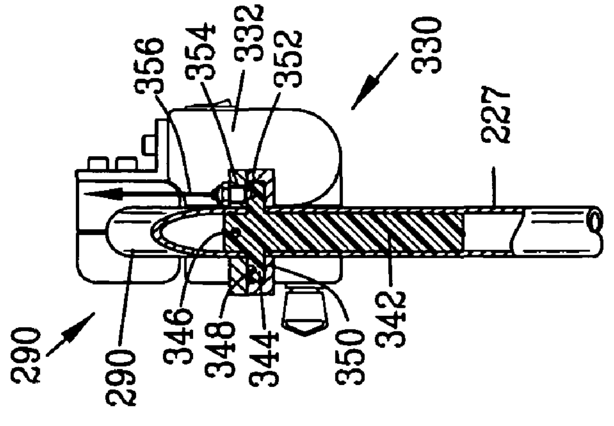
FIG. 31 is a sectional view along line 31-31 in FIG. 27.

FIG. 31 is a sectional view along line 31-31 in FIG. 27 illustrating a journal assembly 340. The journal assembly 340 comprises an internal rotator 342 rotatably received with the upstanding portion 227 of the frame 220. The internal rotator 342 includes an outward extending disk 344 extending outwardly from the internal rotator 342. The internal rotator 342 is secured to the right handle 291 by a fastener 346. The outward extending disk 344 includes a plurality depressions 348.

The journal assembly 340 comprises a disk chamber 350 secure to the upstanding portion 227 of the frame 220. The disk chamber 350 receives the outward extending disk 344 for rotation within the disk chamber 350. The disk chamber 350 includes a pin 352 biased into engagement with the outward extending disk 344 by a spring 354. A pull ring 356 is secured to the pin 352.

The journal assembly 340 locks the rotation position of the right handle 291 in one of the rotational position shown in FIGS. 27-30. The journal assembly 340 locks the rotation position of the right handle 291 when the pin 352 engages one of the plurality depressions 348 with the outward extending disk 344. The pull ring 356 enables an operator to withdrawal of the pin 352 from the depressions 348 for enabling rotation of the right handle 291 between the rotational position shown in FIGS. 27-30.

Figure 32:
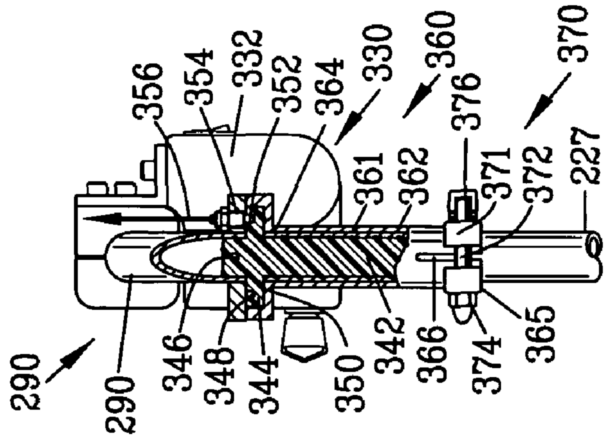
FIG. 32 is a sectional view similar to FIG. 31 illustrating an alternate embodiment of the invention incorporating a right vertical handle adjustment device with the right handle located in a lowered position.

FIG. 32 is a sectional view similar to FIG. 31 illustrating an alternate embodiment of the invention incorporating a vertical handle adjustment device 360. In this example, the vertical handle adjustment device 360 comprises a right vertical handle adjustment device 362 incorporated between the right upstanding portion 227 and the right handle 291. It should be appreciated by those skilled in the art that a left vertical handle adjustment device (not shown) may be incorporated between the left upstanding portion 228 and the left handle 292.

The right vertical handle adjustment device 361 comprising an adjustment sleeve 362 having an internal diameter to slidably engage with the upstanding portion 227. The adjustment sleeve 362 extends between an upper end 364 and a lower end 365. The upper end of the adjustment sleeve 362 is secured to the disk chamber 350. The lower end 365 of the adjustment sleeve 362 includes a slot 366.

Figure 33:
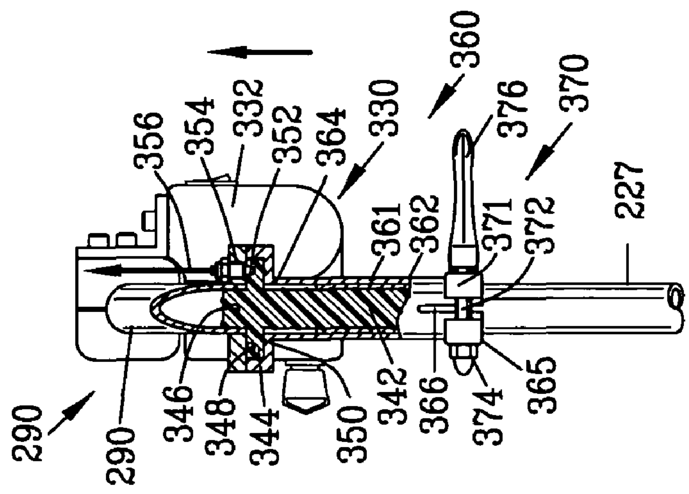
FIG. 33 is a view similar to FIG. 32 illustrating the right handle located in a raised position.

The vertical adjustment device 361 includes a clamping lock 370 for securing the right vertical handle adjustment device 361 in a lowered position as shown in FIG. 32 and a raised position as shown in FIG. 33. The clamping lock 370 comprises a compression ring 371 having a threaded stud 372 extending through ends of the compression ring 371. An adjustment nut 374 is located on one end of the threaded stud 372 whereas a cam lever 376 is located on the other end of the threaded stud 372.

FIG. 32 illustrates the right handle 291 located in the lowered position. The cam lever 376 located in a locked position for securing the right vertical handle adjustment device 361 in the lowered position. The cam lever 376 contracts the compression ring 371 to reduce the diameter of the lower end 365 of the adjustment sleeve 362 in proximity to the slot 366 to secure the adjustment sleeve 362 to the upstanding portion 227.

FIG. 33 is a view similar to FIG. 32 illustrating the right handle 291 located in a raised position. The cam lever 376 located in an unlocked position for enabling the right vertical handle adjustment device 361 to be raised from the lowered position as shown in FIG. 32 to the raised position as shown in FIG. 32. The cam lever 376 is moved into the locked position when the right handle 291 is positioned at the desired vertical height.

Figure 34:
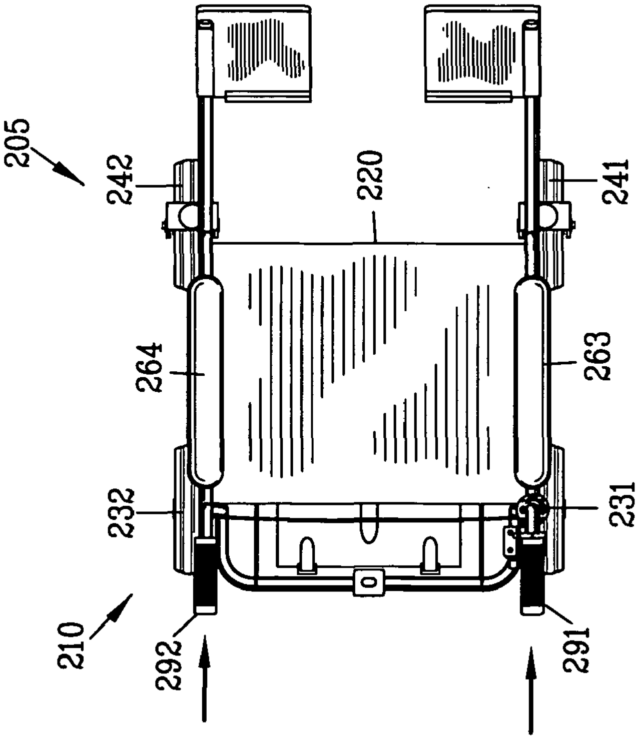
FIG. 34 is a top view of the power wheel chair of FIGS. 21-23 illustrating neutral force applied to the right and left handles of the power wheel chair for directing the power wheel chair in a straight forward direction.

FIG. 34 is a top view of the power wheel chair of FIGS. 21-23 illustrating neutral force applied to the right and left handles 291 and 292 of the power wheel chair 205 for directing the power wheel chair 205 in a straight forward direction.

Figure 35:
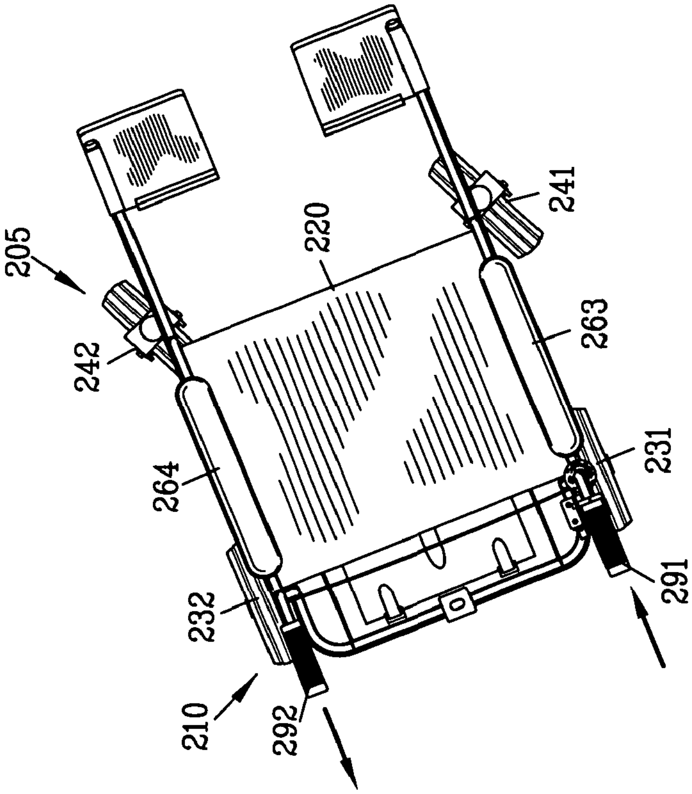
FIG. 35 is a top view similar to FIG. 34 illustrating a rotational force applied to the right and left handles of the power wheel chair for turning the power wheel chair.

FIG. 35 is a top view similar to FIG. 31 illustrating a rotational force applied to the right and left handles 291 and 292 of the power wheel chair 205 for turning the power wheel chair 205. The right and left handles 291 and 292 operate in concert with the differential gearbox 236 for turning the power wheel chair 205.

Figure 36:
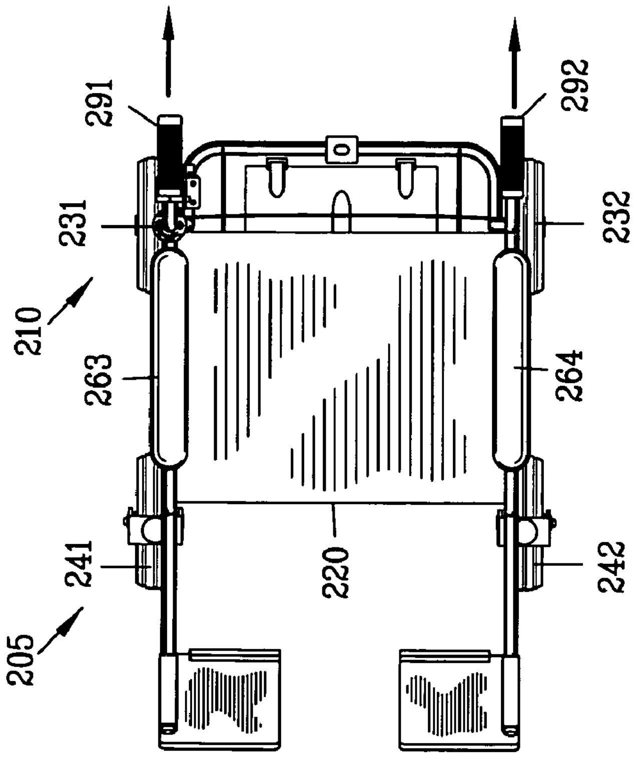
FIG. 36 is a top view of the power wheel chair of FIGS. 21-23 illustrating neutral force applied to the right and left handles of the power wheel chair for directing the power wheel chair in a straight reverse direction.

FIG. 36 is a top view of the power wheel chair of FIGS. 21-23 illustrating neutral force applied to the right and left handles 291 and 292 of the power wheel chair 205 for directing the power wheel chair 205 in a straight reverse direction.

Figure 37:
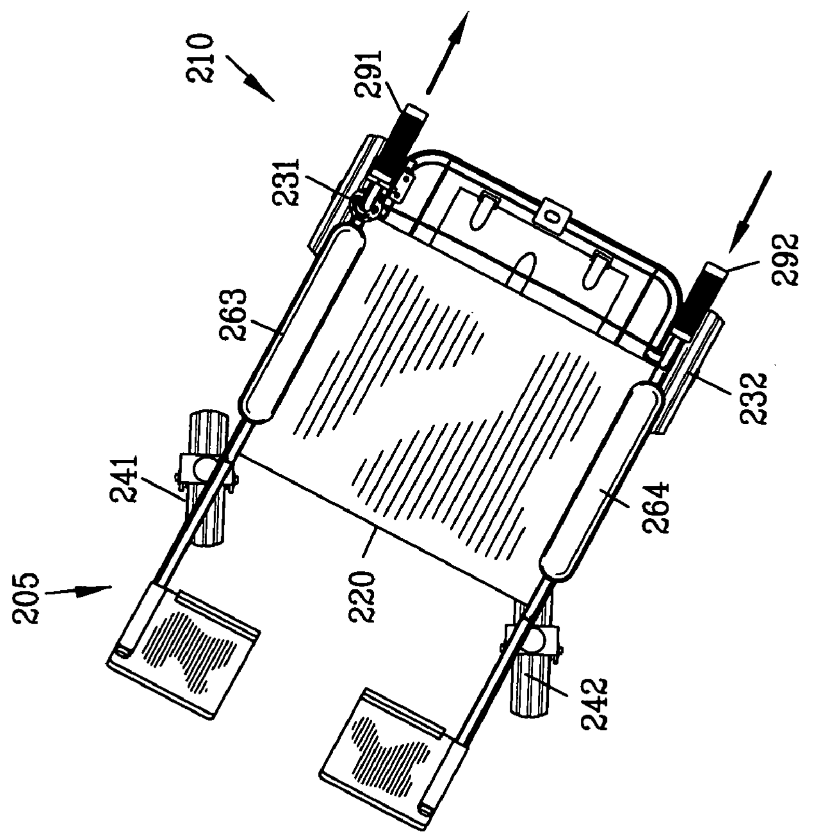
FIG. 37 is a top view of the power wheel chair of FIGS. 21-23 illustrating rotational force applied to the right and left handles of the power wheel chair for directing the power wheel chair in a turning reverse direction.

FIG. 37 is a top view of the power wheel chair of FIGS. 21-23 illustrating rotational force applied to the right and left handles 291 and 292 of the power wheel chair 205 for directing the power wheel chair 205 in a turning reverse direction. The right and left handles 291 and 292 operate in concert with the differential gearbox 236 for turning the power wheel chair 205.

Figure 38:
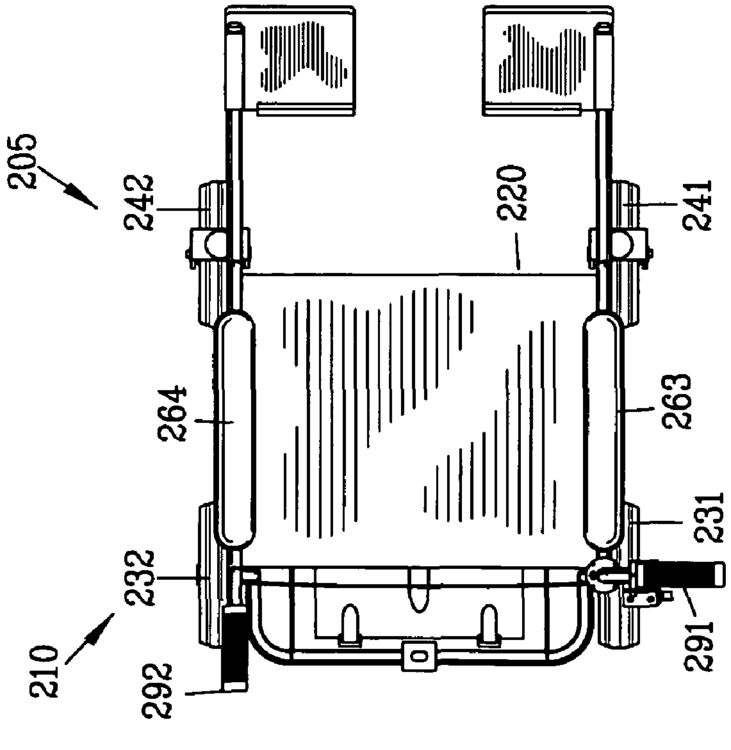
FIG. 38 is a top view of the power wheel chair of FIGS. 21-23 and 29 illustrating neutral force applied to the right handles and the right armrest of the power wheel chair for directing the power wheel chair in a straight forward direction.

FIG. 38 is a top view of the power wheel chair of FIGS. 21-23 and 29 illustrating neutral force applied to the right handles 291 and the right armrest 263 of the power wheel chair 205 for directing the power wheel chair 205 in a forward direction. This configuration enables an attendant (not shown) to operate the power wheel chair 205 adjacent to the right frame section 225 or the right side to the power wheel chair 205.

Figure 39:
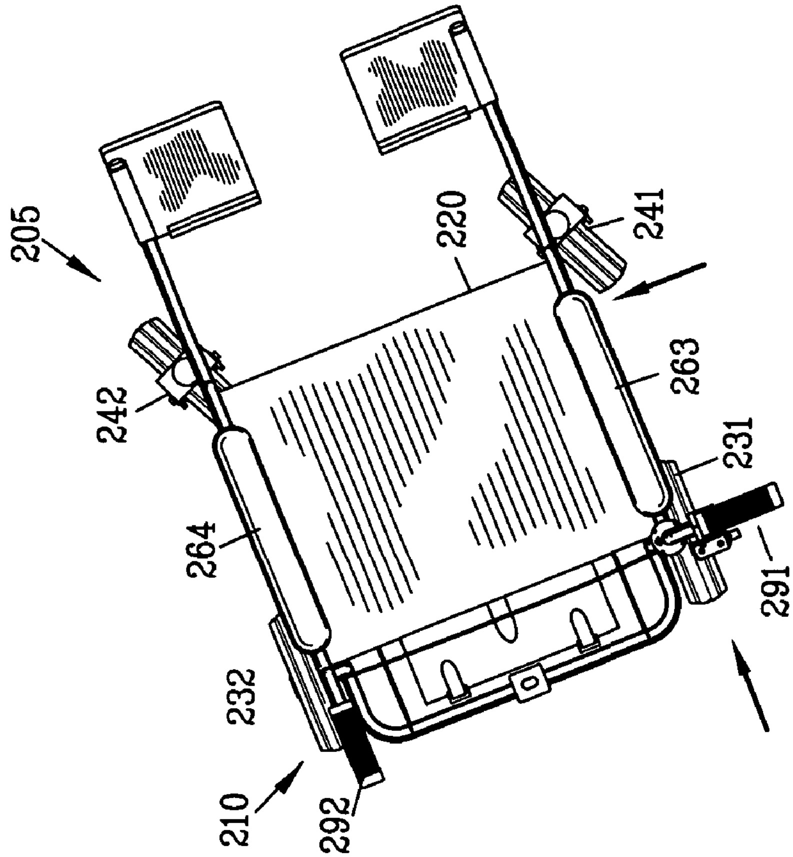
FIG. 39 is a top view of the power wheel chair of FIGS. 21-23 and 29 illustrating rotational force applied to the right handles and the right armrest of the power wheel chair for directing the power wheel chair in a turning forward direction.

FIG. 39 is a top view of the power wheel chair of FIGS. 21-23 and 29 illustrating rotational force applied to the right handles 291 and the right armrest 263 of the power wheel chair 205 for directing the power wheel chair 205 in a turning forward direction. The right and left handles 291 and 292 operate in concert with the differential gearbox 236 for turning the power wheel chair 205.

It should be appreciated by those skilled in the art that a power wheel chair may be fashioned to provide the attendant controlled power wheel chair 5 as shown in FIGS. 1-11 as well as the occupant controlled power wheel chair 5B as shown in FIGS. 12-19.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A power wheel chair having an improved motion control, comprising:

a frame having a right frame section and a left frame section extending between a front frame end and a back frame end;

said frame including a right and left upstanding portion extending in a generally vertical direction; a seat mounted to said frame for transporting an occupant;

a right and a left caster wheel located in proximity to said front frame end adjacent to said right and left frame sections, respectively;

a right and a left drive wheel located in proximity to said rear frame end adjacent to said right and left frame sections, respectively;

a motor for driving said right and left drive wheels through a differential gearbox;

a right and a left handle connected to said right and left upstanding portions, respectively, said right and left handles and a left hand gripping portion;

said right and left handles extending generally horizontally and backwardly from said back frame end;

a journal for rotating one of said right and left handles about a generally vertical axis;

a journal lock for locking one of said right and left handles about said generally vertical axis;

said journal lock locking said one of said right and left handles in a first rotation position whereat said one of said right and left handles is in generally perpendicular alignment with an axle driving said right and left drive wheels through said differential gearbox;

said journal lock locking said one of said right and left handles in a second rotation position whereat said one of said right and left handles is in generally parallel alignment with an axle driving said right and left drive wheels through said differential gearbox; and an electronic control having a control lever located in proximity to one of said right and left handles for enabling the attendant to controlling the speed and braking of the power wheel chair.

2. A power wheel chair as set forth in claim 1, wherein one of said right and left handles includes a vertical adjustment device for adjusting a vertical position of said one of right and left handles; and Said one of said right and left vertical adjustment devices having an adjustment lock for securing said one of right and left handles in a vertical position.

3. A power wheel chair as set forth in claim 1, including a battery cassette receiver secured to said frame;

battery cassette receiver having cassette receiver contacts connected to said frame;

a battery cassette having a battery connected to battery cassette contacts; and said battery cassette being insertable into said battery cassette receiver for interconnecting said battery cassette contacts with said cassette receiver contacts for powering the power wheel chair.

4. A power wheel chair as set forth in claim 1, including a battery cassette receiver secured to said frame;

battery cassette receiver having cassette receiver contacts connected to said frame;

a battery cassette having a battery connected to battery cassette contacts;

said battery cassette being insertable into said battery cassette receiver for interconnecting said battery cassette contacts with said cassette receiver contacts for powering the power wheel chair;

a remote battery cassette receiver located remote from the power wheel chair;

said remote battery cassette receiver having remote receiver cassette contacts connected to a battery charger; and said battery cassette being insertable into said remote battery cassette receiver for interconnecting said battery cassette contacts with said remote cassette receiver contacts for charging said battery.

5. A power wheel chair as set forth in claim 1, wherein said first rotational position aligns said one of said right and left handles extends generally backwardly and perpendicular to said axle driving said right and left drive wheels through said differential gearbox.

6. A power wheel chair as set forth in claim 1, wherein said second rotational position aligns said one of said right and left handles extends generally outwardly and parallel to said axle driving said right and left drive wheels through said differential gearbox.

7. A power wheel chair as set forth in claim 1, wherein said journal rotates said one of said right and left handles about a generally vertical axis into a third rotational position whereat said one of said right and left handles extends generally forwardly and perpendicular to said axle driving said right and left drive wheels through said differential gearbox.

8. A power wheel chair as set forth in claim 1, wherein said journal rotates said one of said right and left handles about a generally vertical axis into a fourth rotational position whereat said one of said right and left handles extends generally inwardly and parallel to said axle driving said right and left drive wheels through said differential gearbox.

* * * * *